US012598225B2

(12) United States Patent
Sangameshwara et al.

(10) Patent No.: US 12,598,225 B2
(45) Date of Patent: Apr. 7, 2026

(54) METHOD AND APPARATUS FOR SHARING SENSOR INFORMATION ON A CALL

(71) Applicant: SAMSUNG ELECTRONICS CO., LTD., Suwon-si (KR)

(72) Inventors: Vijay Sangameshwara, Bangalore (IN); Srinidhi N, Bangalore (IN); Raghavendra Vaddarahalli Rame Gowda, Bangalore (IN); Siva Prasad Gundur, Bangalore (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 392 days.

(21) Appl. No.: 17/523,563

(22) Filed: Nov. 10, 2021

(65) Prior Publication Data

US 2022/0116439 A1     Apr. 14, 2022

Related U.S. Application Data

(63) Continuation of application No. PCT/KR2021/014143, filed on Oct. 13, 2021.

(30) Foreign Application Priority Data

Oct. 13, 2020     (IN) ............................. 202041044599
Oct. 8, 2021     (IN) ............................. 2020 41044599

(51) Int. Cl.
*H04L 12/00*     (2006.01)
*H04L 65/613*     (2022.01)
(Continued)

(52) U.S. Cl.
CPC ............ *H04L 65/613* (2022.05); *H04L 65/65* (2022.05); *H04L 65/1016* (2013.01)

(58) Field of Classification Search
CPC .... H04L 65/613; H04L 65/65; H04L 65/1016
See application file for complete search history.

(56) References Cited

U.S. PATENT DOCUMENTS

2012/0046072 A1     2/2012   Choi et al.
2016/0366567 A1*   12/2016   Lee .......................... H04W 4/10
(Continued)

FOREIGN PATENT DOCUMENTS

CN          207835724          9/2018
JP          5284428          9/2013
(Continued)

OTHER PUBLICATIONS

Arunava Ghosh, et al., "Method to support auxiliary voice over ongoing MCPTX group call for low priority participants", IEEE, 2019, 3 pages.
(Continued)

*Primary Examiner* — Noel R Beharry
*Assistant Examiner* — Lionel Preval
(74) *Attorney, Agent, or Firm* — NIXON & VANDERHYE P.C.

(57)     ABSTRACT

A method for sharing sensor information in a mission critical services (MCX) call is disclosed. The method includes: receiving, by a first user equipment (UE), a sensor message in the MCX call. The method includes obtaining, by the first UE, the sensor information associated with a second UE from the sensor message.

18 Claims, 20 Drawing Sheets

(51) Int. Cl.
   *H04L 65/65* (2022.01)
   *H04L 65/1016* (2022.01)

(56) References Cited

U.S. PATENT DOCUMENTS

| | | | |
|---|---|---|---|
| 2017/0265183 | A1 | 9/2017 | Chen |
| 2018/0160277 | A1* | 6/2018 | Patel ........................ H04W 4/08 |
| 2018/0365909 | A1* | 12/2018 | Cheng ...................... H04Q 9/00 |
| 2019/0150222 | A1 | 5/2019 | Ge et al. |
| 2019/0174208 | A1 | 6/2019 | Speicher et al. |
| 2019/0273773 | A1 | 9/2019 | Pattan et al. |
| 2019/0370569 | A1* | 12/2019 | Gulati ................... G01S 13/931 |
| 2020/0059776 | A1* | 2/2020 | Martin ............. H04M 1/72439 |
| 2020/0084278 | A1* | 3/2020 | Cheng ..................... H04W 4/44 |
| 2021/0321229 | A1 | 10/2021 | Pattan et al. |
| 2021/0329662 | A1* | 10/2021 | Stefanatos ............ H04L 5/0007 |
| 2022/0005354 | A1* | 1/2022 | Baghel ................... G08G 1/162 |
| 2022/0030407 | A1* | 1/2022 | Bercovici ............. H04W 24/02 |
| 2022/0078857 | A1* | 3/2022 | Kim .................. H04W 28/0268 |
| 2023/0180041 | A1* | 6/2023 | Vassilovski ....... H04W 28/0289 |
| | | | 370/229 |

FOREIGN PATENT DOCUMENTS

| | | |
|---|---|---|
| KR | 10-2019-0125361 | 11/2019 |
| WO | 2018/192656 | 10/2018 |
| WO | 2020/050931 | 3/2020 |

OTHER PUBLICATIONS

International Search Report and Written Opinion dated Jan. 11, 2022 in corresponding International Application No. PCT/KR2021/014143.

"3GPP; TSG SA; MCCoRe; Stage 1 (Release 17)", 3GPP TS 22.280 V17.3.0 (Jul. 2020), 3rd Generation Partnership Project; Technical Specification Group Services and System Aspects; Mission Critical Services Common Requirements (MC CoRe); Jul. 11, 2020.

Examination Report issued Apr. 27, 2022 in counterpart Indain Patent Application No. 202041044599.

* cited by examiner

300

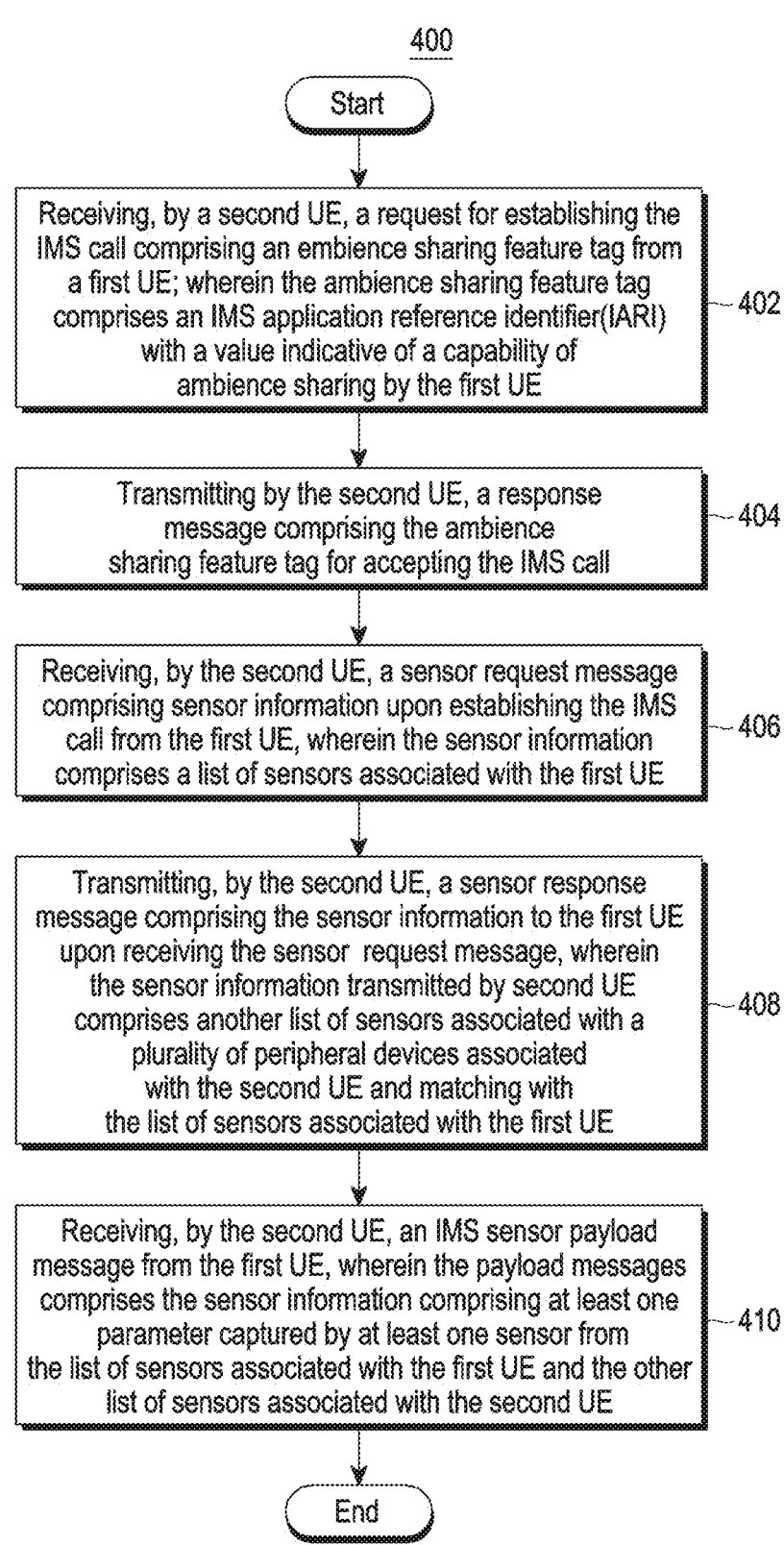

400

Start

Receiving, by a second UE, a request for establishing the IMS call comprising an embience sharing feature tag from a first UE; wherein the ambience sharing feature tag comprises an IMS application reference identifier(IARI) with a value indicative of a capability of ambience sharing by the first UE — 402

Transmitting by the second UE, a response message comprising the ambience sharing feature tag for accepting the IMS call — 404

Receiving, by the second UE, a sensor request message comprising sensor information upon establishing the IMS call from the first UE, wherein the sensor information comprises a list of sensors associated with the first UE — 406

Transmitting, by the second UE, a sensor response message comprising the sensor information to the first UE upon receiving the sensor request message, wherein the sensor information transmitted by second UE comprises another list of sensors associated with a plurality of peripheral devices associated with the second UE and matching with the list of sensors associated with the first UE — 408

Receiving, by the second UE, an IMS sensor payload message from the first UE, wherein the payload messages comprises the sensor information comprising at least one parameter captured by at least one sensor from the list of sensors associated with the first UE and the other list of sensors associated with the second UE — 410

End

| Message name | Subtype | Reference | Direction |
|---|---|---|---|
| Sensor payload | X0000 | Table.3 | Client→Client, C→S |
| Sensor sharing request | X0010 | Table.3 | Client→Client, C→S |
| Sensor sharing response | X0011 | Table.3 | Client→Client, C→S |

| IEI | Information element | Units of measure | Presence | Format |
|---|---|---|---|---|
| 00001 | Ambient temperature | °C | O | TLV-E |
| 00010 | Light | lx | O | TLV-E |
| 00100 | Pressure(barometer) | hPa or mbar | O | TLV-E |
| 01000 | Humidity | % | O | TLV-E |
| 10000 | Wind speed (anemometer) | mph | O | TLV-E |

| Bits | | | | | | | | |
|---|---|---|---|---|---|---|---|---|
| 8 | 7 | 6 | 5 | 4 | 3 | 2 | 1 | |
| 0 | 0 | 0 | 0 | 0 | 0 | 0 | 1 | TEXT |
| 0 | 0 | 0 | 0 | 0 | 0 | 1 | 0 | BINARY |
| 0 | 0 | 0 | 0 | 0 | 0 | 1 | 1 | HYPERLINKS |
| 0 | 0 | 0 | 0 | 0 | 1 | 0 | 0 | FILEURL |
| 0 | 0 | 0 | 0 | 0 | 1 | 0 | 1 | LOCATION |
| 0 | 0 | 0 | 0 | 0 | 1 | 1 | 0 | ENHANCED STATUS |
| 0 | 0 | 0 | 0 | 1 | 0 | 0 | 0 | SENSOR |

MCX Device
(Fire responder)

Wearables data pulled by first responder device along with On-device sensor information shared to MCPTX server MCPX Server

SIP INVITE

SIP BODY:MIME
1. MCPTX INFO
2. SDP
3. SENSOR INFORMATION

SIP INVITE with sensor INFO

Call established

Sensor information

Audio/Video

Signalling plane

Media plane

1100

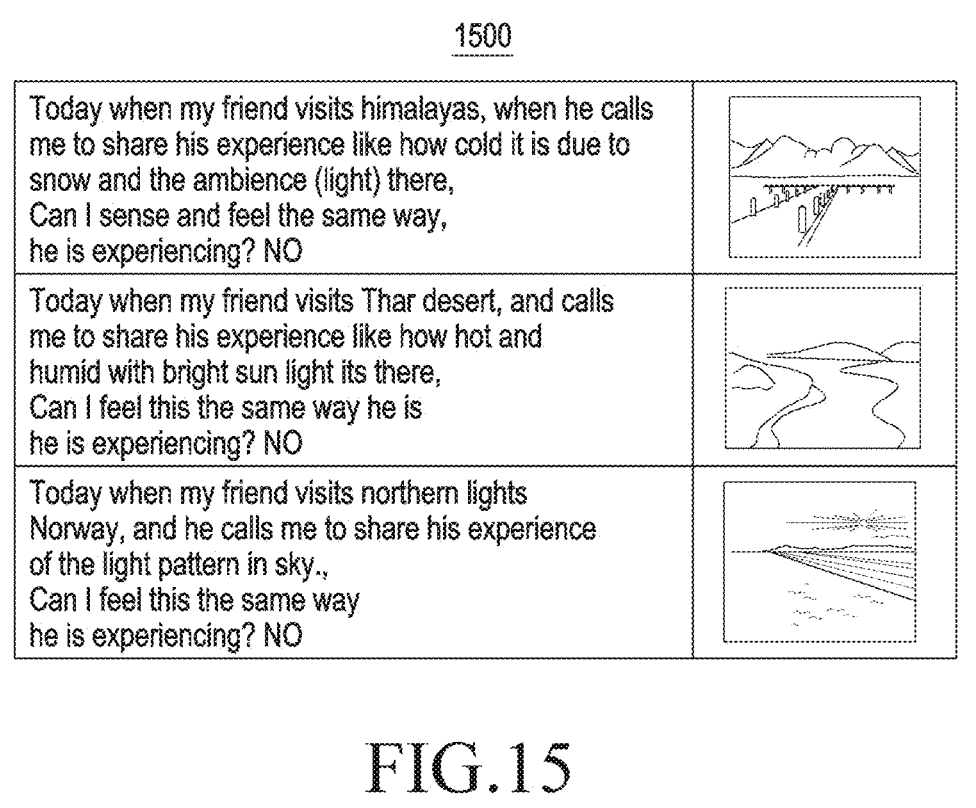

1500

| | |
|---|---|
| Today when my friend visits himalayas, when he calls me to share his experience like how cold it is due to snow and the ambience (light) there, Can I sense and feel the same way, he is experiencing? NO | |
| Today when my friend visits Thar desert, and calls me to share his experience like how hot and humid with bright sun light its there, Can I feel this the same way he is he is experiencing? NO | |
| Today when my friend visits northern lights Norway, and he calls me to share his experience of the light pattern in sky., Can I feel this the same way he is experiencing? NO | |

FIG.15

METHOD AND APPARATUS FOR SHARING SENSOR INFORMATION ON A CALL

CROSS-REFERENCE TO RELATED APPLICATIONS

This application is a continuation of International Application No. PCT/KR2021/014143 designating the United States, filed on Oct. 13, 2021, in the Korean Intellectual Property Receiving Office and claiming priority to Indian Provisional Patent Application No. 202041044599, filed on Oct. 13, 2020, in the Indian Patent Office, and Indian Complete Patent Application No. 202041044599, filed on Oct. 8, 2021, in the Indian Patent Office, the disclosures of all of which are incorporated by reference herein in their entireties.

BACKGROUND

Field

The disclosure relates to sharing sensor information on a call and relates, for example, to a method and an apparatus for sharing the sensor information inside a Mission Critical Services (MCX) group call and an Internet Protocol Multimedia Subsystem (IMS) call.

Description of Related Art

Today, when a person visits any of the eight wonders of world and wants to share the feeling of what it means being there now, the person resorts to video calling another person and sharing a video. However, the other person is not able to feel the senses same as the first person. The other person is just able to watch the scenic place but cannot feel natural aspects like air (breeze), beauty of the lights, and temperature which the first person is able to feel.

Traditionally, under-utilization of sensor data in First Responder's Rugged Smartphone has been noticed. With PS-LTE adoption increasing trend, First Responder is now equipped with Rugged Smart Phones (with dozens of in-built sensors like temperature, light, humidity, pressure etc. and multiple cameras). There is huge critical information with respect to disaster area available with "On-Ground First Responder" devices, which is inaccessible to Dispatcher, sitting in Control room directly. Dispatcher has to rely on other public sources (like security camera, fire alarm detectors, social network) which shall be time consuming and may not be relevant.

Traditionally, 3GPP defines Mission Critical Services (MCX) comprises with 3 main services such as, MCPTT that enables first responder to communicate with their voice, MCVideo that enables first responder to stream video, e.g., live video streaming from a fire disaster area etc., and MCData that enables first responder with real time messaging and sharing files. But none of the above service define system and methods to share information captured by sensor embedded as part of First responders handheld device.

As Public Safety Industry is undergoing revolution with trending technologies like IoT, Sensor, wearables. Similarly First Responders are already seeing transition in their handheld devices replaced with Rugged Smart Phones with dozen of "inbuilt sensors" (like temperature, light, humidity, pressure etc. and multiple cameras) and wearables. There is huge Information regarding disaster area available with "On Ground First Responder" devices which are inaccessible to Dispatcher directly and is less conceived as focus is more on Sensors and IoT in Public domain.

Dispatcher has to rely on other public sources (like IoT device security camera, fire alarm detectors and social media network) which can be time consuming and may not be relevant. For example, During Fire Disaster, the on ground Fire Responders performing rescue operations has more meaningful and relevant information about disaster area (like Fire Intensity Images, Temperature and Light intensity).

Furthermore, the IP Multimedia Subsystem (IMS) is a reference architecture defined by the 3rd Generation Partnership Project (3GPP) for delivering communication services built on the Internet Protocol (IP). Along with providing a framework for evolving from classic circuit switch (CS) to packet switch (PS) telephony.

IMS has been used for sometime now for ViLTE, VoLTE calls and Messaging. Off late, there have been less value-added features in terms of richness.

Sharing Ambience during Live Video Call is a challenge which is restricting the "FEEL FACTOR" for Customersdue to under-utilization of available sensor information on-device in Call services.

Table 1 illustrates a MCX Payloads, in accordance with an existing technique. The inability of the current payloads defined in MCX to carry sensor data is evident.

TABLE 1

| MC Service | Current Payload Defined | |
|---|---|---|
| MCPTT 24.380 | Along with Voice, below are the payloads supported: "MCPT" (i.e. Floor control): Table 8.2.2.1-1 "MCPC" (i.e. Pre-established session call control): Table 8.3.2-1 "MCMC" (i.e. MBMS subchannel control): Table 8.4.2-1 | |
| MCVideo 24.581 | Along with Voice and Video, below are the payloads supported: "MCV0" (i.e. Transmission control messages from transmission control participant to the transmission control server) "MCV1" (i.e. Transmission control messages from transmission control server and transmission control participant) "MCV2" (i.e. Transmission control messages from transmission control participant to the transmission control server and vice-versa) "MCV3" (i.e. MBMS subchannel control) "MCV4" (i.e. Notification control) | |
| MCData 24.582 | Refer to Table 15.1.2.1-1: below message format supported in SDS SIGNALLING PAYLOAD SDS signalling payload message identity Date and time Conversation ID Message ID InReplyTo message ID | Refer to Table 15.1.3.1-1: below message format supported in FD SIGNALLING PAYLOAD FD signalling payload message identity Date and time Conversation ID Message ID InReplyTo message ID |

TABLE 1-continued

| MC Service | Current Payload Defined |
| --- | --- |
| Application ID | Application ID |
| SDS disposition request type | FD disposition request type |
| Extended application ID | Mandatory download |
| User location | Payload |
| | Metadata |
| | Extended application ID |

Thus, there is a need for a solution that overcomes the above deficiencies.

SUMMARY

Embodiments of the disclosure provide a method for sharing sensor information in a mission critical services (MCX) call. The method includes receiving, by a first user equipment (UE), a sensor message in the MCX call. The method includes obtaining, by the first UE, the sensor information associated with a second UE from the sensor message.

In accordance with various example embodiments of the present disclosure, a first user equipment (UE) including a transceiver and at least one processor is disclosed. The at least one processor is configured to control the transceiver to receive a sensor message in a mission critical services (MCX) call, and obtain the sensor information associated with a second UE from the sensor message.

In accordance with various example embodiments of the present disclosure, a method for sharing sensor information over a 3GPP Internet Protocol (IP) Multimedia Subsystem (IMS) call is disclosed. The method includes: receiving, by a second user equipment (UE), a request for establishing the IMS call comprising an ambience sharing feature tag from a first UE; wherein the ambience sharing feature tag comprises an IMS Application Reference Identifier (IARI) having a value indicative of a capability of ambience sharing by the first UE; transmitting by the second UE, a response message comprising the ambience sharing feature tag for accepting the IMS call; receiving, by the second UE, a sensor request message comprising sensor information upon establishing the IMS call from the first UE. The sensor information comprises a list of sensors associated with the first UE. The method includes: transmitting, by the second UE, a sensor response message comprising the sensor information to the first UE upon receiving the sensor request message. The sensor information transmitted by second UE comprises another list of sensors associated with a plurality of peripheral devices associated with the second UE and matching with the list of sensors associated with the first UE. The method includes: receiving, by the second UE, an IMS sensor payload message from the first UE. The payload messages comprise the sensor information comprising at least one parameter captured by at least one sensor from the list of sensors associated with the first UE and the other list of sensors associated with the second UE.

In accordance with various example embodiments of the present disclosure, a system including a method for sharing sensor information in a call is disclosed. The method includes: receiving, by at least one receiver User Equipment (UE), a sensor message comprising sensor information associated with at least one transmitter UE in the call. The method includes: decoding, by the at least one receiver UE, the sensor information from the sensor message.

In accordance with various example embodiments of the present disclosure, a system including a method for sharing sensor information over a 3GPP Internet Protocol (IP) Multimedia Subsystem (IMS) call is disclosed. The method includes: receiving, by a second UE, a request for establishing the IMS call comprising an ambience sharing feature tag from a first UE; wherein the ambience sharing feature tag comprises an IMS Application Reference Identifier (IARI) having a value indicative of a capability of ambience sharing by the first UE. The method includes transmitting by the second UE, a response message comprising the ambience sharing feature tag for accepting the IMS call. The method includes receiving, by the second UE, a sensor request message comprising sensor information upon establishing the IMS call from the first UE. The sensor information comprises a list of sensors associated with the first UE. The method includes transmitting, by the second UE, a sensor response message comprising the sensor information to the first UE upon receiving the sensor request message. The sensor information transmitted by second UE comprises another list of sensors associated with a plurality of peripheral devices associated with the second UE and matching with the list of sensors associated with the first UE. The method includes receiving, by the second UE, an IMS sensor payload message from the first UE. The payload messages comprise the sensor information comprising at least one parameter captured by at least one sensor from the list of sensors associated with the first UE and the other list of sensors associated with the second UE.

To further describe advantages and features of the present disclosure, a more particular description of the present disclosure will be made with reference to various example embodiments thereof, which is illustrated in the appended drawings. It is appreciated that these drawings depict only example embodiments of the present disclosure and are therefore not to be considered limiting of its scope. The present disclosure will be described and explained with additional specificity and detail with the accompanying drawings.

BRIEF DESCRIPTION OF THE DRAWINGS

The above and other aspects, features and advantages of certain embodiments of the present disclosure will be more apparent from the following detailed description, taken in conjunction with the accompanying drawings in which:

FIG. 4 is a flowchart illustrating an example method for sharing sensor information in an IMS call, in accordance with various embodiments;

FIG. 6D is a table illustrating an example subtype definition for each sensor message type, in accordance with various embodiments;

FIG. 6E is a table illustrating an example sensor payload definition, in accordance with various embodiments;

FIG. 6F is a table illustrating an example payload content type, in accordance with various embodiments;

FIG. 15 is a diagram illustrating an image depicting a number of use cases corresponding to the FIGS. 12A, 13A, and 14A, in accordance with an existing technique.

Figure 1:
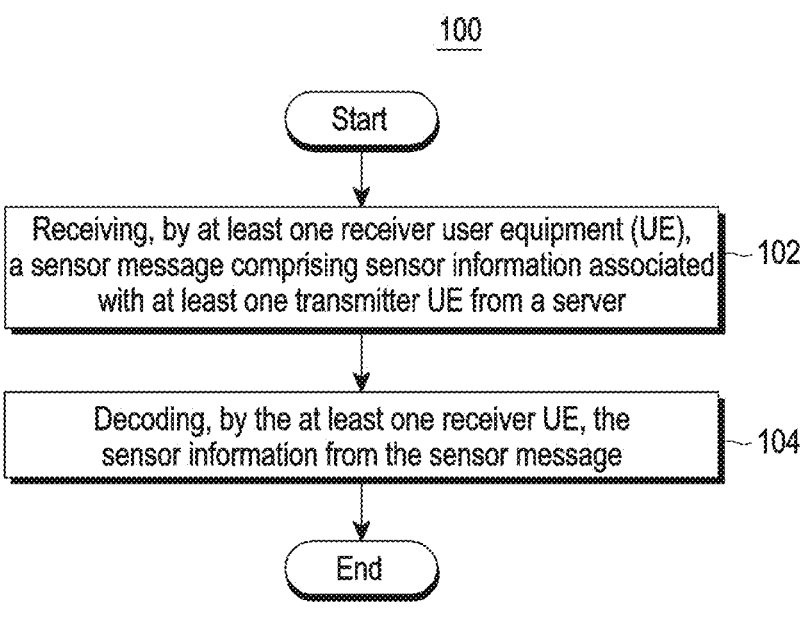
FIG. 1 is a flowchart illustrating an example method for sharing sensor information in a call, in accordance with various embodiments.

Further, skilled artisans will appreciate that elements in the drawings are illustrated for simplicity and may not have been necessarily been drawn to scale. For example, the flowcharts illustrate the method in terms of the most prominent steps involved to help to improve understanding of aspects of the present disclosure. Furthermore, in terms of the construction of the device, one or more components of the device may have been represented in the drawings by conventional symbols, and the drawings may show only those specific details that are pertinent to understanding the embodiments of the present disclosure so as not to obscure the drawings with details that will be readily apparent to those of ordinary skill in the art having benefit of the description herein.

DETAILED DESCRIPTION

Reference will now be made to example embodiments illustrated in the drawings and specific language will be used to describe the same. It will nevertheless be understood that no limitation of the scope of the present disclosure is thereby intended, such alterations and further modifications in the illustrated system, and such further applications of the principles of the present disclosure as illustrated therein being contemplated as would normally occur to one skilled in the art to which the present disclosure relates.

It will be understood by those skilled in the art that the foregoing general description and the following detailed description are explanatory of the present disclosure and are not intended to be restrictive thereof.

Reference throughout this disclosure to "an aspect", "another aspect" or similar language may refer, for example, to a particular feature, structure, or characteristic described in connection with the embodiment being included in at least one embodiment of the present disclosure. Thus, appearances of the phrase "in an embodiment", "in another embodiment" and similar language throughout this specification may, but do not necessarily, all refer to the same embodiment.

The terms "comprises", "comprising", or any other variations thereof, are intended to cover a non-exclusive inclusion, such that a process or method that comprises a list of steps does not include only those steps but may include other steps not expressly listed or inherent to such process or method. Similarly, one or more devices or sub-systems or elements or structures or components proceeded by "comprises. a" does not, without more constraints, preclude the existence of other devices or other sub-systems or other elements or other structures or other components or additional devices or additional sub-systems or additional elements or additional structures or additional components.

Unless otherwise defined, all technical and scientific terms used herein have the same meaning as commonly understood by one of ordinary skilled in the art to which this disclosure belongs. The system, methods, and examples provided herein are illustrative only and not intended to be limiting.

FIG. 1 is a flowchart 100 illustrating an example method for sharing sensor information in a call, in accordance with various embodiments. The present disclosure includes a new payload to represent the sensor information. The new payload may be designed to consume minimal bandwidth. In an embodiment, the sensor information may be shared during the call. In an embodiment, the sensor information may be shared upon initiation of the call. In an embodiment, the call may be one of a group call and a private call. In an embodiment, the call is one of a Mission Critical Service (MCX) call, and an IP Multimedia Subsystem (IMS) call within a 3GPP network through an Internet Protocol based communication. In an embodiment, examples of the MCX call may include, but are not limited to, one of a MCX group call, a MCX private call, a MCX messaging, a Mission-Critical Push-To-Talk (MCPTT) call, a MCVideo call, a MCData message. In an embodiment, examples of the IMS call may include, but are not limited to, one of an IMS group call, an IMS private call, a voice call, a video call and future immersive calls such as an Augmented Reality (AR) call and a Virtual Reality (VR) call, a holographic call and message conversations.

According to an embodiment, the method may include receiving (operation 102), by at least one receiver User Equipment (UE), a sensor message comprising sensor information associated with at least one transmitter UE in the call. In an embodiment, the sensor message may be received by the at least one UE from a server. In an embodiment, the server may receive the sensor message from the at least one transmitter. In an embodiment, the sensor message may be received by the at least one UE from the at least one transmitter UE. In an embodiment, the sensor message may be one of a MCX sensor message, and an IMS sensor message.

Upon receiving the sensor message, the method may include decoding (operation 104), by the at least one receiver UE, the sensor information from the sensor message. In an embodiment, the sensor information may include at least one of a list of sensors associated with the at least one transmitter UE, and at least one parameter captured by at least one sensor amongst the list of sensors associated with the at least one transmitter UE. Examples of the at least one parameter may include, but are not limited to, one or more of a temperature, light, pressure, humidity, and wind speed associated with a surrounding environment. Examples of the at least one sensor may include, but are not limited to, an on-device sensor, a wearable device associated with the at least transmitter, an Internet of Things (IoT) device associated with the at least one transmitter.

Figure 2:
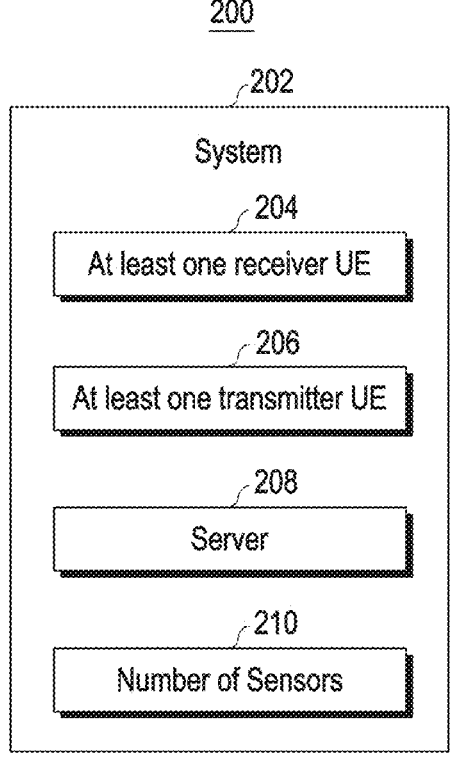
FIG. 2 is a block diagram illustrating an example configuration of a system for sharing sensor information in a call, in accordance with various embodiments.

FIG. 2 is a block diagram 200 illustrating an example system 202 for sharing sensor information in a call, in accordance with various embodiments. In an embodiment, the system 202 may include at one receiver UE 204, at least one transmitter UE 206 and a server 208. In an embodiment, the at least one receiver UE 204 and the at least one transmitter UE 206 may be configured to communicate with one another through the server 208 such that the at least one receiver 204 may receive the sensor information associated with the at least one transmitter UE 206 through the server 208. In an embodiment, the at least one receiver UE 204 may receive the sensor information associated with the at least one transmitter UE 206 from the at least one transmitter UE 206.

In an embodiment, the sensor information may be shared during the call. In an embodiment, the sensor information may be shared upon initiation of the call. In an embodiment, the call may be one of a group call and a private call. In an embodiment, the call is one of a MCX call, and an IMS call within a 3GPP network through an Internet Protocol based communication. In an embodiment, examples of the MCX call may include, but are not limited to, one of a MCX group call, a MCX private call, a MCX messaging, a Mission-Critical Push-To-Talk (MCPTT) call, a MCVideo call, a MCData message. In an embodiment, examples of the IMS call may include, but are not limited to, one of an IMS group call, a voice call, a video call and future immersive calls such as an Augmented Reality (AR) call and a Virtual Reality (VR) call, a holographic call and message conversations.

Examples of the at least one transmitter UE 206 may include, but are not limited to, a smartphone, a tab, a laptop or the like. Continuing with the above embodiment, the at least one transmitter UE 206 may be configured to receive the sensor information from a least one sensor amongst the number of sensors 210 associated with the at least one transmitter UE 206. In an embodiment, examples of the sensor information may include, but are not limited to, one or more of temperature, light, pressure, humidity, and wind speed associated with a surrounding environment as captured by the at least one sensor associated with the at least one transmitter UE 206. In an embodiment, the number of sensors may be incorporated within the at least one transmitter UE 206. In an embodiment, the number of sensors may be present in the vicinity of the at least one transmitter UE 206. In an embodiment, each sensor may be a wearable sensor worn by a user of the at least one transmitter UE 206.

The at least one transmitter UE 206 may be configured to encode a sensor message including the sensor information. Upon encoding the sensor message, the at least on transmitter UE 206 may be configured to share the sensor message with the server 208. Upon receiving the sensor message from the at least one transmitter UE 206, the server 208 may be configured to transmit the sensor message to the at least one receiver UE 204.

The at least one receiver UE 204 may be configured to receive the sensor message from the server 208. Subsequent to receiving the sensor message, the at least one receiver UE 204 may be configured to decode the sensor information from the sensor message. Examples of the at least one receiver UE 204 may include, but are not limited to, a smartphone, a tab, a laptop or the like. In an embodiment, the sensor message may be based on an application-defined Real-time Transport Control Protocol (RTCP) Packet format. In an embodiment, the senor message may be one of a MCX message, and an IMS sensor message.

The at least one receiver UE 204 may be configured to receive the sensor message comprising the sensor information associated with the at least one transmitter UE 104 in the call. In an embodiment, the sensor message may be received from the server 106. In an embodiment, the server 106 may receive the sensor message from the at least one transmitter UE 104. In an embodiment, the sensor message may be received by the at least one receiver UE 102 from the at least one transmitter UE 104. In an embodiment, the sensor message may be one of a MCX sensor message, and an IMS sensor message.

Figure 3:
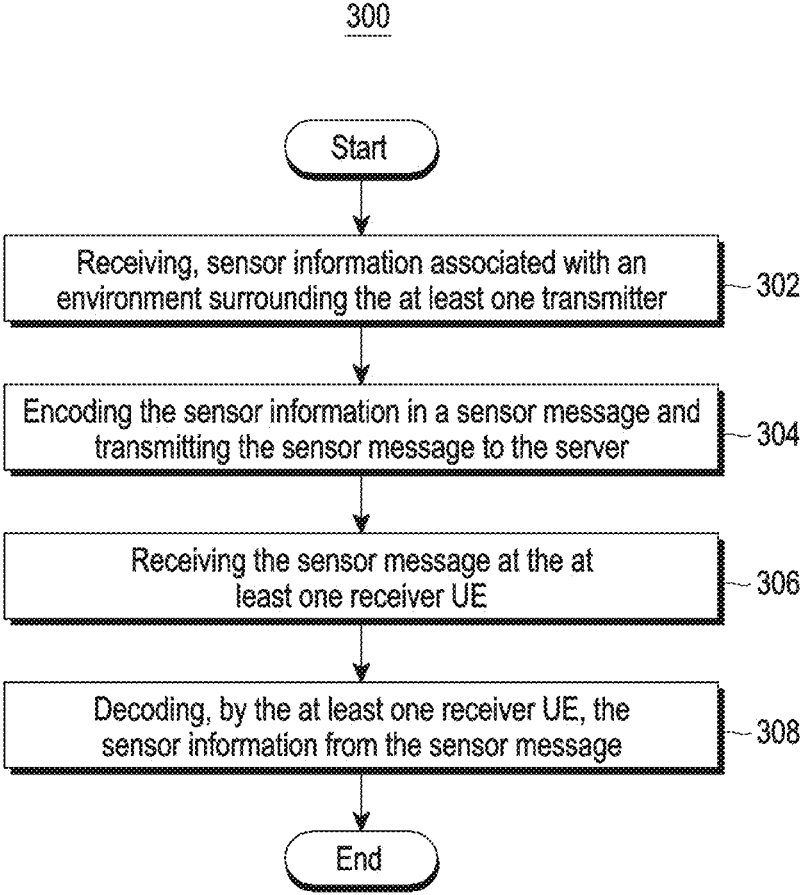
FIG. 3 flowchart illustrating an example process for sharing sensor information in a call, in accordance with various embodiments.

FIG. 3 is a flowchart 300 illustrating an example process for sharing sensor information in a call, in accordance with various embodiments. In an embodiment, the process may be performed by the system 202 as referred in FIG. 2. Further, the present disclosure includes a new payload to represent the sensor information. Furthermore, the new payload may be designed to consume minimal bandwidth.

The process may include receiving (operation 302), sensor information associated with an environment surrounding the at least one transmitter 206 as referred in the FIG. 2. In an embodiment, the sensor information may be received from the number of sensors 210. In an embodiment, the sensor information may include at least one of a list of sensors from the number of sensors 210 associated with the at least one transmitter UE 206, and at least one parameter captured by the at least one sensor amongst the list of sensors associated with the at least one transmitter UE 206. Examples of the at least one parameter may include, but are not limited to, temperature, light, pressure, humidity, and wind speed associated with the environment surrounding the at least one transmitter 206.

The process may proceed towards encoding (operation 304) the sensor information in a sensor message and transmitting the sensor message to the server 208. In an embodiment, the sensor message may be transmitted to the at least one receiver UE 204. In an embodiment, the sensor message may be based on an application-defined Real-time Transport Control Protocol (RTCP) Packet format. In an embodiment, the senor message may be one of a MCX message, and an IMS sensor message.

In an embodiment, where the sensor message is the MCX message, the sensor message may include a name field, a subtype, a synchronization Source (SSRC), a sensor message field. Furthermore, the name field may include a Mission Critical Sensor Message (MCSM) to identify an RTCP Message as a sensor message in the MCX group call. In an embodiment, the subtype may include a value amongst X0000, X0010 and X0011. In an embodiment, the value X0000 may indicate a presence of the sensor payload captured from the at least one sensor in the MCX sensor payload message. Furthermore, the value X0010 may indicate a presence of a sensor request from the at least one transmitter UE and the value X0011 may indicate a presence of a sensor response from the at least one receiver UE. Moving forward, the SSRC may be associated with the at least one transmitter UE. Furthermore, the sensor message field may include one of a sensor payload, the sensor request, and the sensor response based on the subtype.

In an embodiment, where the sensor message is the IMS message, the sensor message may include a name field, a subtype, a synchronization source (SSRC), a sensor message field. Furthermore, the name field may include a Sensor Message (SM) to identify an RTCP Message as a sensor message in the IMS call. In an embodiment, the subtype may include a value amongst X0000, X0010 and X0011. In an embodiment, the value X0000 may indicate a presence of the sensor payload captured from the at least one sensor in the MCX sensor payload message. Furthermore, the value X0010 may indicate a presence of a sensor request from the at least one transmitter UE and the value X0011 may indicate a presence of a sensor response from the at least one receiver UE. Moving forward, the SSRC may be associated with the at least one transmitter UE. Furthermore, the sensor message field may include one of a sensor payload, the sensor request, and the sensor response based on the subtype.

In response to transmission of the sensor message, the process may proceed towards receiving (operation 306) the sensor message at the at least one receiver UE 204. In an embodiment, the at least one receiver UE 204 may receive the sensor message from the server 208. In an embodiment, the at least one receiver UE 204 may receive the sensor message from the at least one transmitter UE 206.

The at least one receiver UE 204, the process may proceed towards decoding (operation 308), by the at least one receiver UE 204, the sensor information from the sensor message.

FIG. 4 is a flowchart 400 illustrating an example method for sharing sensor information in an IMS call, in accordance with various embodiments. In an embodiment, examples of the IMS call may include, but are not limited to, a voice call, a video call, future immersive calls such as an Augmented Reality (AR) call and a Virtual Reality (VR) call, a holographic call, and message conversations. In an embodiment, the sensor information may be shared between a first UE and a second UE such that the first UE transmits the sensor information to the second UE. In an embodiment, the first UE may be the at least one transmitter UE and the second UE may be the at least one receiver UE as referred in FIG. 1.

The method may include receiving (operation 402), by the second UE, a request for establishing the IMS call comprising an ambience sharing feature tag from the first UE. In an embodiment, the ambience sharing feature tag may include an IMS Application Reference Identifier (IARI) with a value. In an embodiment, the value may be indicative of a capability of ambience sharing by the first UE. In an embodiment, the value may be represented in the ambience sharing feature tag as "urn%3Aurn-7%3A3gpp-application-.ims.iari.ambienceshare".

The method may proceed towards, transmitting (operation 404) by the second UE, a response message to the first UE. In an embodiment, the response message may include the ambience sharing feature tag for accepting the IMS call in response to receiving the request for establishing the IMS call from the first UE.

The method proceed towards receiving (operation 406), by the second UE, a sensor request message from the first UE upon establishing the IMS call from the first UE. In an embodiment, the sensor request message may include the sensor information. In an embodiment, the sensor information may include a list of sensors associated with the first UE. In an embodiment, each sensor amongst the list of sensors may be configured to capture at least one parameter from an environment surrounding the first UE. Examples of the at least one parameter may include, but are not limited to, temperature, light, pressure, humidity, and wind speed associated with a surrounding environment of the first UE. In an embodiment, each sensor amongst the list of sensors may be incorporated in the first UE. In an embodiment, each sensor may be present in the vicinity of the first UE. In an embodiment, each sensor may be a wearable sensor worn by a user of the first UE.

In an embodiment, the sensor request message transmitted by the first UE may be generated based on transmitting, by an IMS client in the first UE, a query to a sensor manager associated with a number of sensors associated with the first UE for determining an availability of the plurality of sensors. Furthermore, the sensor manager may be configured to determine the list of sensors available upon receiving the query, indicating a presence of the at least one sensor amongst the plurality of sensors. Further, the sensor manager may be configured to share the list of available sensors to the IMS client for generating the sensor request message. Moving forward, the IMS client may be configured to transmit the sensor request message to the second UE.

The method may include transmitting (operation 408), by the second UE, a sensor response message to the first UE in response to receiving the sensor request message. In an embodiment, the sensor response message may include the sensor information. In an embodiment, the sensor information transmitted by the second UE may include at least one sensor identified from the list of sensors matching with at least one peripheral device amongst a number of peripheral devices associated with the second UE. Examples of the number of peripheral devices may include, but are not limited to, one or more of an Air Conditioner (AC), a heater, a light, a blower, a curtain, one or more smart devices, and one or more smart home devices.

In an embodiment, the sensor response message may be generated based on transmitting, by an IMS client in the second UE, a query to a service manager associated with the number of peripheral devices associated with the second UE for determining an availability of the number of peripheral devices. Furthermore, the service manager may be configured to generate the list of peripheral devices available amongst the number of peripheral devices upon receiving the query. Further, the service manage may be configured to transmit the list of peripheral devices to the IMS client in the second UE. The IMS client in the second UE may be configured to identify the at least one sensor amongst the list of sensors matching with the at least one peripheral device amongst the list of peripheral devices. In an embodiment, the identification may be based on determining that sensor payload associated such as the at least one parameter associated with the at least one sensor may be rendered by the at least one peripheral device associated with the second UE. Further, the IMS client in the second UE may be configured to transmit the sensor response message including the at least one sensor to the first UE.

Upon receiving the sensor response message, the IMS client in the first UE may be configured to transmit a query to the sensor manager to fetch information captured from the at least one sensor. Furthermore, the sensor manager may be configured to send the captured sensor information to the IMS client upon receiving the query. The IMS client in the first UE may be configured to transmit the sensor information in an IMS sensor payload message received from the sensor manager to the second UE.

The method may include receiving (operation 410), by the second UE, the IMS sensor payload message from the first UE. In an embodiment, the IMS payload messages may include the sensor information including the at least one parameter captured by the at least one sensor from the list of sensors associated with the first UE.

In an embodiment, the sensor message may include a name field, a subtype, a synchronization source (SSRC), and a sensor message field. Furthermore, the name field may include a sensor message (SM) to identify an RTCP Message as a Sensor Message in the IMS call. In an embodiment, the subtype may include a value amongst X0000, X0010 and X0011. In an embodiment, the value X0000 may indicate a presence of the sensor payload captured from the at least one sensor in the IMS Sensor Payload message. In an embodiment, the value X0010 may indicate a presence of the sensor request from the first UE and the value X0011 may indicate a presence of the sensor response from the second UE. Furthermore, the SSRC may be associated with the first UE. In an embodiment, the sensor message field may include one of a sensor payload, a sensor request, and a sensor response based on the subtype.

Figure 5:
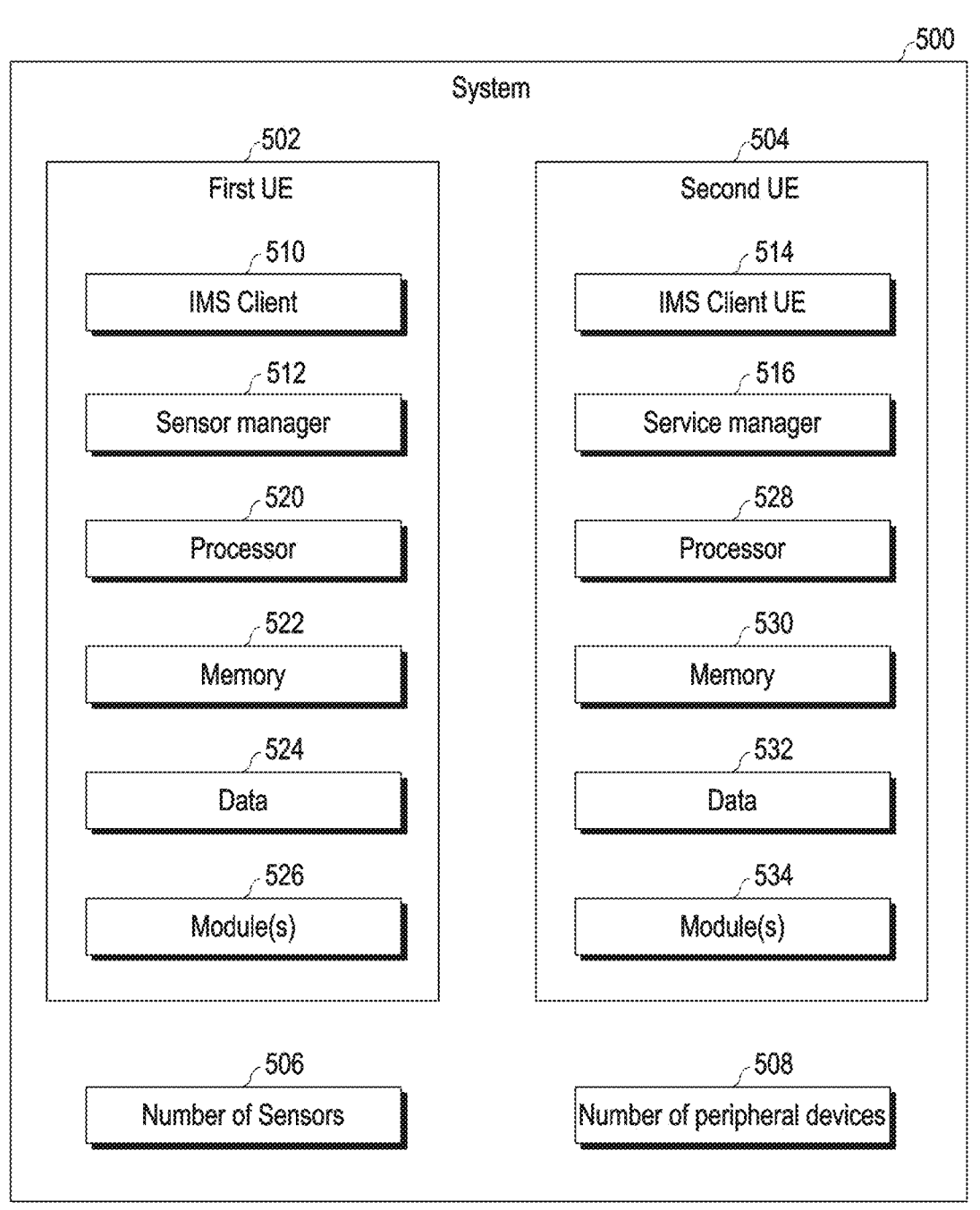
FIG. 5 is a block diagram illustrating an example configuration of a system for sharing sensor information in an IMS call, in accordance with various embodiments.

FIG. 5 is a block diagram illustrating an example system 500 for sharing sensor information in an IMS call, in accordance with various embodiments. The configuration of FIG. 4 may be understood as a part of the configuration of the system 500. Hereinafter, it is understood that terms including "unit" or "er" at the end may refer to the unit for processing at least one function or operation and may be implemented in hardware, software, or a combination of hardware and software.

Referring to FIG. 5, the system 500 may include a first UE 502, and a second UE 504, a number of sensors 506, and a number of peripheral devices 508. In an embodiment, the first UE 502 may include an IMS client 510, a sensor manager 512 communicating with the number of sensors 506. The second UE 504 may include another IMS client 514, and a service manager 516 communicating with the number of peripheral devices 508. In an embodiment, each of the number of peripheral devices 508 may include an Internet of Things (IoT) device. In an embodiment, the number of peripheral devices 508 may include another list of sensors associated with the number of peripheral devices. Examples of the peripheral devices 508 may include, but are not limited to, one or more of an Air Conditioner (AC), a heater, a light, a blower, a curtain, one or more smart thing devices, and one or more smart home devices. Examples of the first UE 502 and the second UE 504 may include, but are not limited to, a smartphone, a laptop, and a tab. In an embodiment, the first UE may further include a processor (e.g., including processing circuitry) 520, a memory 522, data 524, module(s) 526. Further, the second UE may include a processor (e.g., including processing circuitry) 528, a memory 530, data 532, and module(s) 534.

In an embodiment, the IMS client 510, the sensor manager 512, the processor 520, the memory 522, the data 524, and the module(s) 526 may be communicably coupled with one another. Furthermore, the IMS client 514, the service manager 516, the processor 528, the memory 530, the data 532, and the module(s) 534 may be communicably coupled with one another.

In an example, the processor 520 may include various processing circuitry, including, for example, a single processing unit or a number of units, all of which could include multiple computing units. The processor 520 may be implemented as one or more microprocessors, microcomputers, microcontrollers, digital signal processors, central processing units, processor cores, multi-core processors, multiprocessors, state machines, logic circuitries, application-specific integrated circuits, field-programmable gate arrays and/or any devices that manipulate signals based on operational instructions. Among other capabilities, the processor 520 may be configured to fetch and/or execute computer-readable instructions and/or data stored in the memory 522.

In an example, the memory 522 may include any non-transitory computer-readable medium known in the art including, for example, volatile memory, such as static random access memory (SRAM) and/or dynamic random access memory (DRAM), and/or non-volatile memory, such as read-only memory (ROM), erasable programmable ROM (EPROM), flash memory, hard disks, optical disks, and/or magnetic tapes. The memory 522 may include the data 524.

The data 524 serves, amongst other things, as a repository for storing data processed, received, and generated by one or more of IMS client 510, the sensor manager 512, the processor 520, the memory 522, and the module(s) 526.

The module(s) 526, amongst other things, may include routines, programs, objects, components, data structures, etc., which perform particular tasks or implement data types. The module(s) 526 may also be implemented as, signal processor(s), state machine(s), logic circuitries, and/or any other device or component that manipulate signals based on operational instructions.

Further, the module(s) 526 may be implemented in hardware, instructions executed by at least one processing unit, for e.g., processor 520, or by a combination thereof. The processing unit may be a general-purpose processor which executes instructions to cause the general-purpose processor to perform operations or, the processing unit may be dedicated to performing the required functions. In another aspect of the present disclosure, the module(s) 526 may be machine-readable instructions (software) which, when executed by a processor/processing unit, may perform any of the described functionalities.

In various example embodiments, the module(s) 526 may include machine-readable instructions (software) which, when executed by a processor/processing unit, perform any of the described functionalities.

In an example, the processor 528 may be a single processing unit or a number of units, all of which could include multiple computing units. The processor 528 may be implemented as one or more microprocessors, microcomputers, microcontrollers, digital signal processors, central processing units, processor cores, multi-core processors, multiprocessors, state machines, logic circuitries, application-specific integrated circuits, field-programmable gate arrays and/or any devices that manipulate signals based on operational instructions. Among other capabilities, the processor 528 may be configured to fetch and/or execute computer-readable instructions and/or data stored in the memory 530.

In an example, the memory 530 may include any non-transitory computer-readable medium known in the art including, for example, volatile memory, such as static random access memory (SRAM) and/or dynamic random access memory (DRAM), and/or non-volatile memory, such as read-only memory (ROM), erasable programmable ROM (EPROM), flash memory, hard disks, optical disks, and/or magnetic tapes. The memory 530 may include the data 532.

The data 532 serves, amongst other things, as a repository for storing data processed, received, and generated by one or more of IMS client 514, the sensor manager 516, the processor 528, the memory 530, and the module(s) 534.

The module(s) 534, amongst other things, may include routines, programs, objects, components, data structures, etc., which perform particular tasks or implement data types. The module(s) 534 may also be implemented as, signal processor(s), state machine(s), logic circuitries, and/or any other device or component that manipulate signals based on operational instructions.

Further, the module(s) 534 may be implemented in hardware, instructions executed by at least one processing unit, for e.g., processor 528, or by a combination thereof. The processing unit may be a general-purpose processor which executes instructions to cause the general-purpose processor to perform operations or, the processing unit may be dedicated to performing the required functions. In another aspect of the present disclosure, the module(s) 534 may be machine-readable instructions (software) which, when executed by a processor/processing unit, may perform any of the described functionalities.

In various example embodiments, the module(s) 534 may be machine-readable instructions (software) which, when executed by a processor/processing unit, perform any of the described functionalities.

In an embodiment, the first UE 502 may transmit a request for establishing the IMS call to the second UE 504 through the IMS client 510. Furthermore, the second UE 504 may be configured to receive the request for establishing the IMS call. In an embodiment, the IMS call may include an ambience sharing feature tag from the first UE 502 indicative of a capability of ambience sharing by the first UE 502.

In an embodiment, the second UE 504 may be configured to transmit a response message comprising the ambience sharing feature tag for accepting the IMS call. Upon receiving the response message, the first UE 502 may be configured to generate a sensor request message for transmitting the sensor request message through the IMS client 510 to the second UE 504. For generating the sensor request message, the IMS client 510 may be configured to transmit a query to the sensor manager 516 associated with the number of sensors 506 with the first UE 502 for determining an availability of the number of sensors 506. In response to receiving the query, the sensor manager 516 may be configured to determine a list of sensors available indicating presence of at least one sensor amongst the number of sensors 506. Further, the sensor manager 516 may be configured to share the list of available sensors in to the IMS client 510 for generating the sensor request message. Furthermore, the IMS client 510 may transmit the sensor request message to the second UE.

In an embodiment, the second UE 504 may be configured to receive the sensor request message including the sensor information upon establishing the IMS call from the first UE 502. In an embodiment, the sensor information may include the list of sensors associated with the first UE 502. The second UE 504 may transmit a sensor response message including the sensor information to the first UE 502 upon receiving the sensor request message. In an embodiment, the sensor information transmitted by second UE 504 comprises at least one sensor amongst the list of sensor matching with at least one peripheral device amongst the number of peripheral devices 508 associated with the second UE 504.

In an embodiment, the sensor response message may be generated based on transmitting, by the other IMS client 514 in the second UE 504, a query to the service manager 516 associated with the number of peripheral devices 508 for determining an availability of the number of peripheral devices 508.

The service manager 516 may be configured to generate a list of peripheral devices available amongst the number of peripheral devices 508 upon receiving the query and transmitting the list of peripheral devices to the other IMS client 514 in the second UE 504. Further, the other IMS client 514 may be configured to identify the at least one sensor from the list of sensor matching with at least one peripheral device amongst the list of peripheral devices associated with the first UE 502. In an embodiment, the identification may be based on determining that the at least one sensor associated with the first UE 502 includes the sensor information that may be rendered by the at least one peripheral devices from number of peripheral devices 508.

The IMS client 514 may transmit the sensor response message including the at least one sensor to the first UE 502. In response to receiving the sensor response message, the first UE 502 may be configured to transmit an IMS sensor payload message. In an embodiment, the IMS payload message may include the sensor information comprising at least one parameter captured by the at least one sensor from the list of sensors associated with the first UE 502 and the list of sensors associated with the second UE 504. Examples of the at least one parameter may include, but are not limited to, temperature, light, pressure, humidity, and wind speed associated with the environment surrounding the first UE 502. In an embodiment, the IMS payload message may be generated based on transmitting, by the IMS client 510 in the first UE 502a query to the sensor manager 510 to fetch information captured from the at least one sensor upon receiving the sensor response message. In an embodiment, the sensor manager 510 may send the captured sensor information to the IMS client 510 upon receiving the query. Furthermore, the IMS client 510 in the first UE 502, may transmit the sensor information in the IMS sensor payload message to the second UE.

Figure 6A:
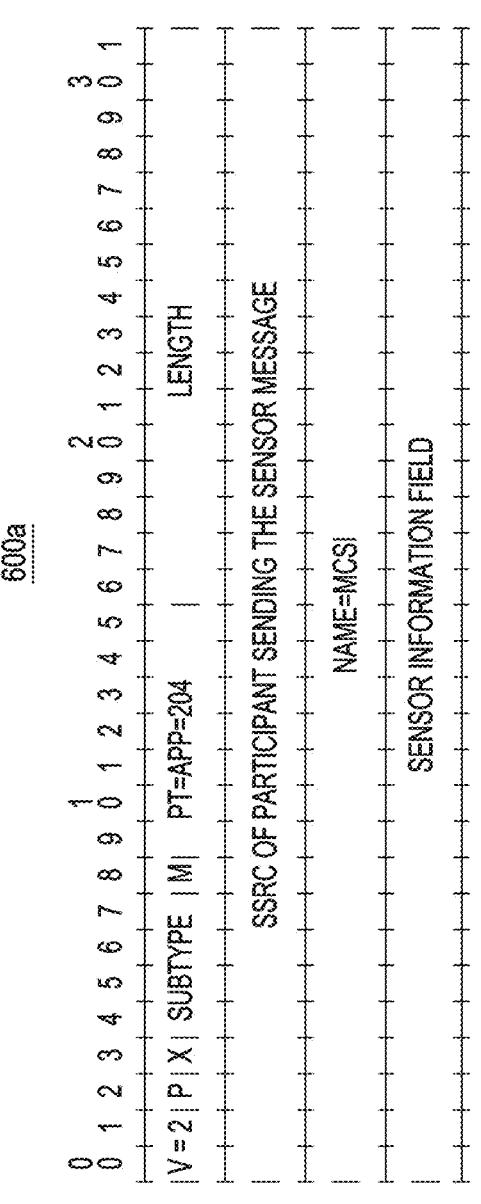
FIG. 6A is a diagram illustrating an example RTCP:APP message format for Mission Critical Sensor Message (MCSM), in accordance with various embodiments.

FIG. 6A is a diagram 600a illustrating an example RTCP: APP message format for Mission Critical Sensor Message (MCSM), in accordance with various embodiments. In an embodiment, the RTCP:APP message format may include a request message and a response message allowing a number of UE to discover sensors supported by one another for sharing relevant sensor information in a payload message. In an embodiment, the RTCP:APP message format may include a subtype, an SSRC of the UE transmitting sensor message, a name field, and a sensor message field.

In an embodiment, the subtype may include a value amongst X0000, X0010 and X0011 as illustrated in FIG. 6D. When the subtype is X0000, the "sensor information" may include a list of sensors along with captured sensor data with respect to an ambience from at least one sensor from a number of sensors attached to a receiver UE. In an embodiment, where the subtype is X0011, the "sensor information" includes the list of sensors related to the ambience for which there is a peripheral device associated with the receiver UE. In an embodiment, where the subtype is X0010, the "sensor information" includes the list of sensor related to the ambience fetched by an on-device sensor in a sender UE and a wearable attached to the sender UE.

Figure 6B:
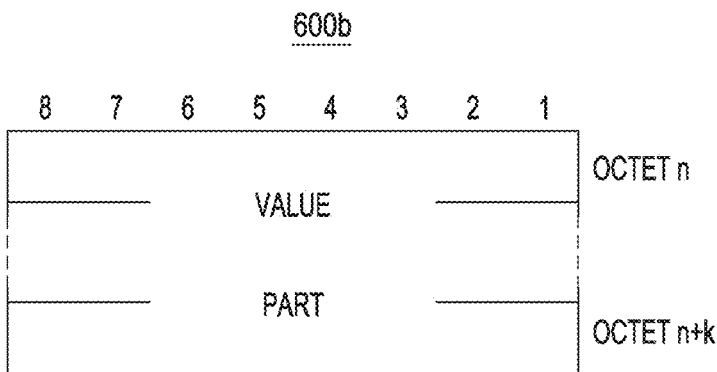
FIG. 6B is a diagram illustrating an example sensor message field in case of a sensor request, a sensor response message type in accordance with various embodiments.

FIG. 6B is a diagram 600*b* illustrating an example sensor message field in case of a sensor request, a sensor response message type, in accordance with various embodiments. In an embodiment, the table 600*b* may be of type 3 of format V (k=0, 1, 2 . . . ). In an embodiment, the sensor message field may be interpreted based on a message type such as a sensor request and a sensor response. A length related to the sensor message field may be derived from a RTCP:APP message length header. A value may be calculated by applying a logical OR operation of sensor information supported by the UE. The sensor message field may be filled with recurring 0s to align with a 4 byte boundary.

Figure 6C:
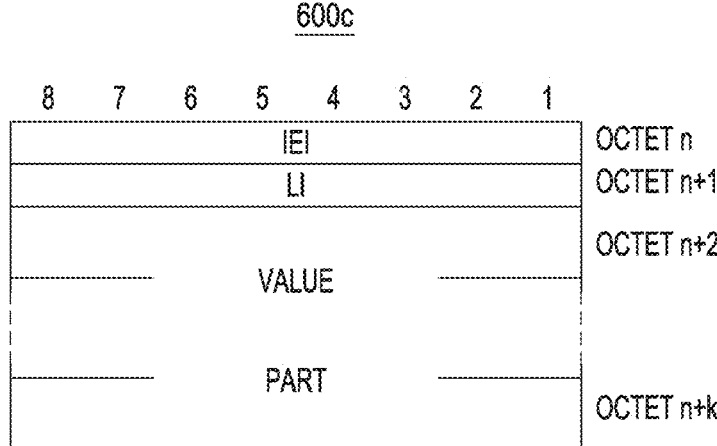
FIG. 6C is a diagram illustrating an example sensor message field in case of a sensor payload message type for the MCSM, in accordance with various embodiments.

FIG. 6C is a diagram 600*c* illustrating an example sensor message field in case of a sensor payload message type for the MCSM, in accordance with various embodiments. In an embodiment, the table 600*c* may be of type 4 IE of format TLV (k=0, 1, 2 . . . ). A sensor payload field may represent one or more sensor information values.

FIG. 6D is a table 600*d* illustrating an example subtype definition for each sensor message type, in accordance with various embodiments. The sensor message type includes request and response messages that allows User Equipment (UE) to discover sensors supported by each other and share only the relevant sensor information in sensor payload message. Sensor Message (SM) field shall be interpreted based on message type like:

Sensor Request and Response: The "SM" field represents (type 3); format "V" standard information element as per 3GPP 24.007 release-11 referred in FIG. 6*b* and the length is derived from RTCP APP message length header. The value is calculated by performing logical "OR" of value present in Information Element Identifier (IEI) column represented in FIG. 6*e* for which a sensor is present in the UE. To align with 4-byte boundary the SI field shall be filled with recurring 0s.

Sensor Payload represents one or more sensor message values captured on-device, wherein each sensor information is represented in (type 6); "TLV-E" standard information element format as per 3GPP 24.007 release-11 referred in FIG. 6C and defined in FIG. 6E.

FIG. 6E is a table 600*e* illustrating an example sensor payload definition, in accordance with various embodiments.

Feasibility of Format with Services:
1. MCPTT and MCVIDEO can use this format as illustrated in FIG. 6A directly.
2. VoLTE and VILTE shall use same format defined in the table 600*a* in FIG. 6A with name="SM" in RTCP APP message format.
3. MCData shall use only sensor payload message format as illustrated in the FIG. 6C and FIG. 6E shared in SDS messages with new "message type" proposal to 3GPP 24.282 specification as illustrated in FIG. 6F.
4. RCS messaging shall use only sensor payload message format as illustrated in FIG. 6C, FIG. 6E shared in standalone messages with proposed new "message type" value defined below in SIP content type header:
Content Type: application/ambience info.

FIG. 6F is a table 600*f* illustrating an example payload content type, in accordance with various embodiments.

Figure 7:
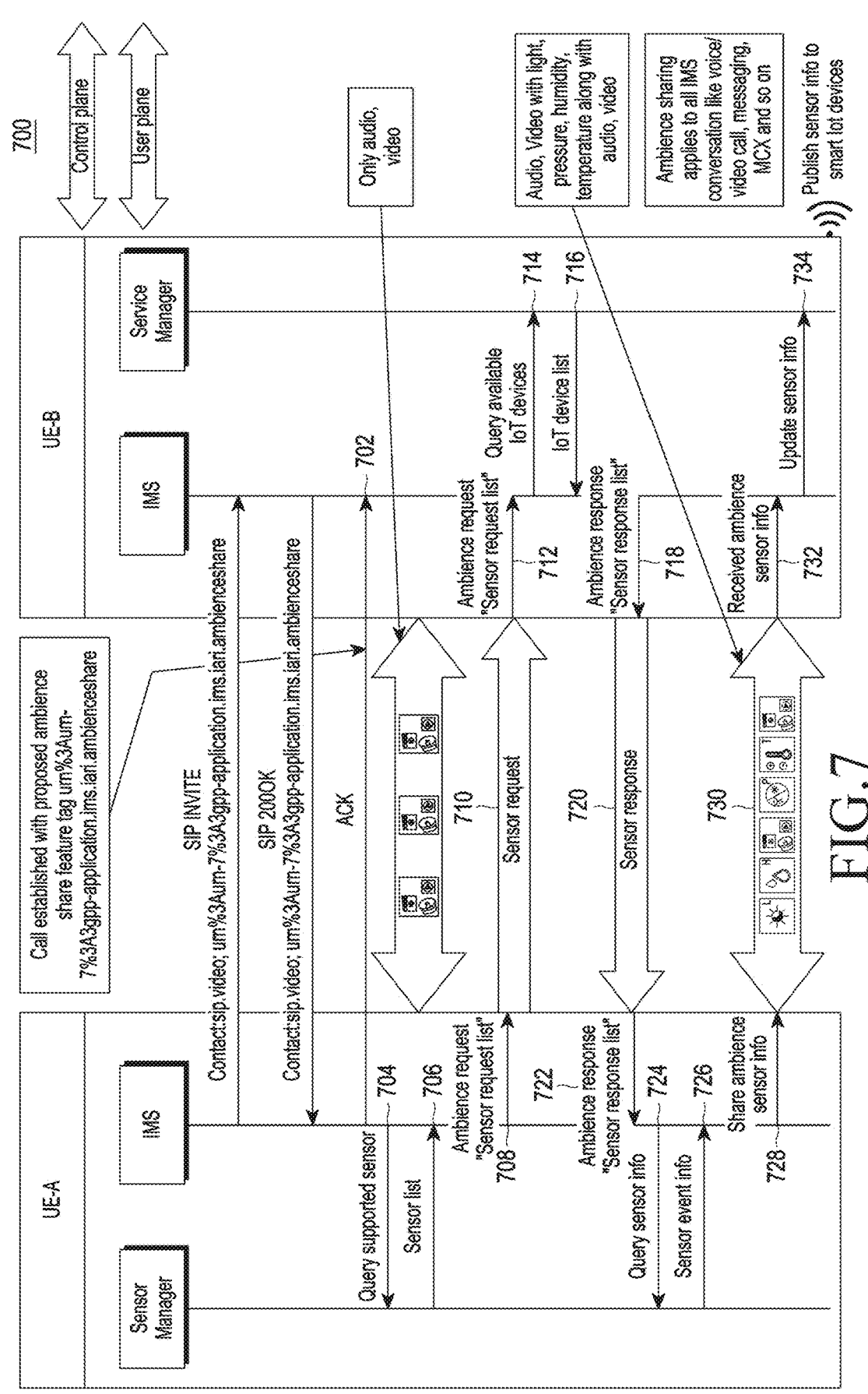
FIG. 7 is an operational flow diagram illustrating example ambience sharing in an IMS call, in accordance with various embodiments.

FIG. 7 is an operational flow diagram 700 illustrating example ambience sharing in an IMS call, in accordance with various embodiments. In an embodiment, the ambience sharing call may be performed by adding a new feature tag with value below in SIP Contact Header or other relevant SIP header. In an embodiment, the ambience is shared through a call between two User Equipment (UE) (UE-A and UE-B). In an embodiment, the ambience may be experienced by sharing sensor information related to one or more of light, pressure, temperature, and humidity along with audio and video. "urn%3Aurn-7%3A3gpp-application.ims.iari.ambienceshare".

In an embodiment, the UE-A may be the first UE 502 and the UE-B may be the second UE 504 as referred in FIG. 5. Furthermore, the sensor manager in the UE-A may be the sensor manager 512, the IMS client may be the IMS client 510 as referred in FIG. 5. The service manager in the UE-B may be the service manager 516, and the IMS client in the UE-B may be the IMS client 514 as referred in FIG. 5. In an embodiment, the IoT devices in the UE-B may be the peripheral devices 508 as referred in FIG. 5.

In an embodiment, the UE-A may transmit (operation 702) a request for establishing the IMS call to the UE-B through the IMS client 510. The UE-B may be configured to receive the request for establishing the IMS call. In an embodiment, the request for establishing the IMS call may include an ambience sharing feature tag from the UE-A indicative of a capability of ambience sharing by the UE-A. In an embodiment, the ambience sharing feature tag may include an IMS Application Reference Identifier (TART) with a value. In an embodiment, the value may be indicative of a capability of ambience sharing by the first UE. In an embodiment, the value may be represented in the ambience sharing feature tag as "urn%3Aurn-7%3A3gpp-application. ims.iari.ambienceshare".

In an embodiment, the UE-B may be configured to transmit a response message comprising the ambience sharing feature tag for accepting the IMS call. Upon receiving the response message, the UE-A may be configured to generate a sensor request message for transmitting the sensor request message through the IMS client 510 to the UE-B. For generating the sensor request message, the IMS client 510 may be configured to transmit (operation 704) a query to the sensor manager 516 associated with the number of sensors 506 with the UE-A for determining an availability of the number of sensors 506. In response to receiving the query, the sensor manager 516 may be configured to determine a list of sensors available indicating presence of at least one sensor amongst the number of sensors 506. Further, the sensor manager 516 may be configured to share (operation 706) the list of available sensors to the IMS client 510 for generating the sensor request message. Furthermore, the IMS client 510 may incorporate (operation 708) the list of available sensors in the sensor request message. Furthermore, the IMS client 510 may transmit (operation 710) the sensor request message to the second UE.

In an embodiment, the UE-B may be configured to receive (operation 712) the sensor request message including the sensor information upon establishing the IMS call from the UE-A through the IMS client 516. In an embodiment, the sensor information may include the list of sensors associated with the UE-A. Furthermore, the UE-B may transmit a sensor response message including the sensor information to the UE-A upon receiving the sensor request message. In an embodiment, the sensor information transmitted by UE-B may include at least one sensor amongst the list of sensors matching with at least one peripheral device amongst the number of peripheral devices 508 associated with the UE-B.

In an embodiment, the sensor response message may be generated based on transmitting (operation 714), by the other IMS client 514 in the UE-B, a query to the service manager 516 associated with the number of peripheral devices 508 for determining an availability of the number of peripheral devices 508.

The service manager 516 may be configured to generate the list of peripheral devices available amongst the number of peripheral devices 508 upon receiving the query and transmitting (operation 716) the list of peripheral devices to the other IMS client 514 in the UE-B. In an embodiment, the service manager 516 may be a SmartThings service also referred as an IoT device manager running on the UE-B. Furthermore, the service manager 516 may be configured to control the number of peripheral devices 508. Further, the other IMS client 514 may be configured to identify at least one sensor amongst the list of sensors associated with the UE-A matching with the at least one peripheral device amongst the list of peripheral devices. In an embodiment, the identification may be based on determining that the at least one sensor associated with the UE-A includes the sensor information that may be rendered by the at least one peripheral device from number of peripheral devices 508. Furthermore, the at least one sensor amongst the list of sensors may be added (operation 718) in the sensor response message.

The IMS client 514 may transmit (operation 720) the sensor response message comprising the at least one sensor amongst the list of sensors to the UE-A. In an embodiment, the UE-A may receive (operation 722) the sensor response message at the IMS client 510. In response to receiving the sensor response message, the UE-A may be configured to transmit an IMS sensor payload message. In an embodiment, the IMS payload message may include the sensor information including at least one parameter captured by the at least one sensor from the at least one sensor associated with the UE-A. Examples of the at least one parameter may include, but are not limited to, temperature, light, pressure, humidity, and wind speed associated with the environment surrounding the UE-A. In an embodiment, the IMS payload message may be generated based on transmitting (operation 724), by the IMS client 510 in the UE-A a query to the sensor manager 510 to fetch information captured from the at least one sensor, upon receiving the sensor response message. In an embodiment, the sensor manager 510 may send (operation 726) the captured sensor information to the IMS client 510 upon receiving the query. Furthermore, the IMS client 510 in the UE-A, may incorporate (operation 728) the captured sensor information in the IMS sensor payload message. Furthermore, the IMS client 510 may transmit (operation 730) the sensor information in the IMS sensor payload message to the second UE. The IMS client 514 may receive (operation 732) the captured sensor information. Further, the IMS client 514 may update (operation 734) sensor information at the at least one peripheral devices 510.

Figure 8:
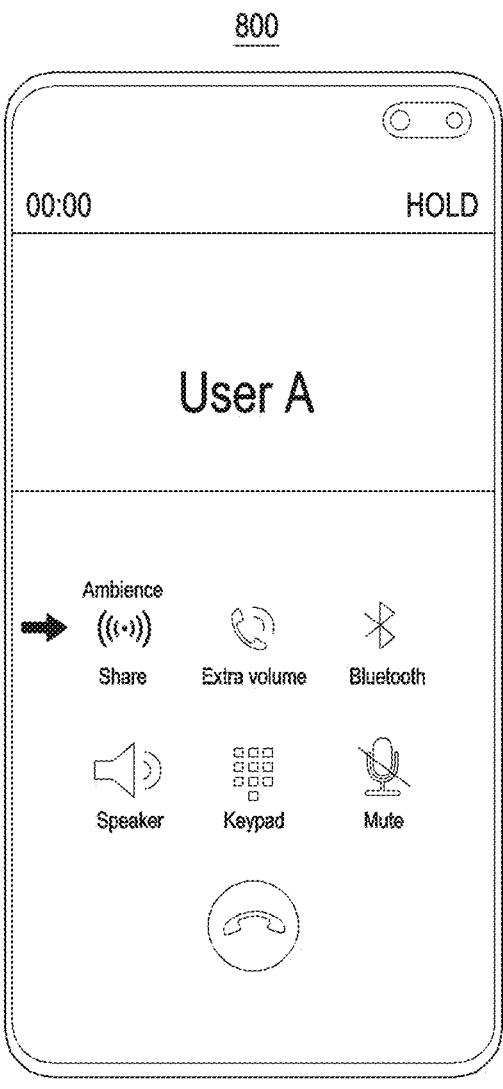
FIG. 8 is a diagram illustrating an example user interface depicting an IMS call for sharing an ambience, in accordance with various embodiments.

FIG. 8 is a diagram illustrating an example user interface 800 depicting an IMS call for sharing an ambience, in accordance with various embodiments. In an embodiment, the user interface 800 depicts that the IMS call is established with a user A with an ambience feature tag. In an embodiment, the ambience feature tag may be configured to enable an "Ambience Share" button. In an embodiment, the "Ambience Share" button may be leveraged by an end user on call with the user A to initiate an ambience sharing feature with the user A on the IMS call.

Figure 9:
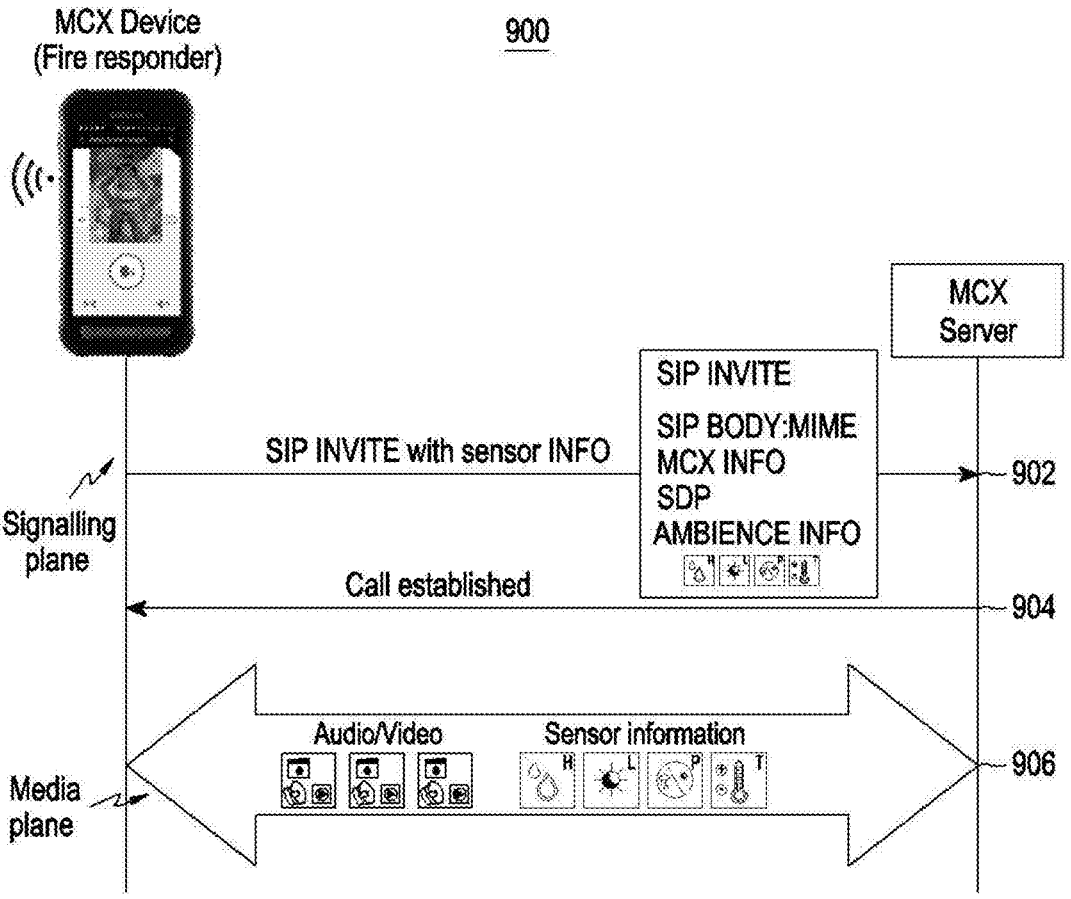
FIG. 9 is a signal flow diagram illustrating an example process for transmitting sensor information carrying ground data through a MCX call, in accordance with various embodiments.

FIG. 9 is a signal flow diagram 900 illustrating an example process for transmitting sensor information carrying ground data through a MCX call, in accordance with various embodiments. Further, the present disclosure includes a new payload to represent the sensor data and is designed to consume minimal bandwidth. In an embodiment, the process includes communicating between a MCX device and a MCX server.

At operation 902, the process includes transmitting a Session Initiation Protocol (SIP) INVITE including the sensor information from the MCX device to the MCX server through a signaling plane.

At operation 904, the process includes establishing the MCX call by the MCX server with the MCX device.

At operation 906, the process includes transmitting the sensor information from the MCX device to the MCX server during the MCX call through a media plane.

Figure 10:
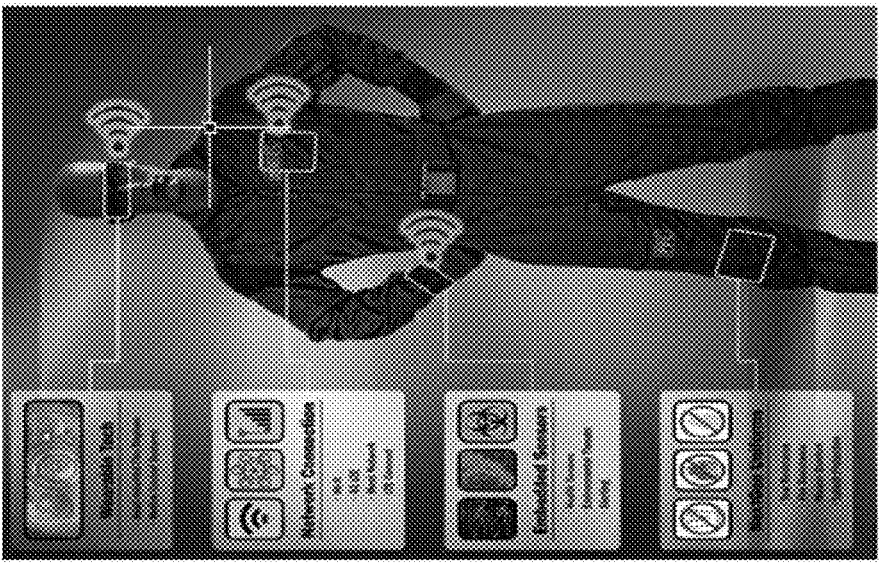
FIG. 10 is a signal flow diagram illustrating an example MCX call with ground data, in accordance with various embodiments.

FIG. 10 is a signal flow diagram 1000 illustrating an example MCX call with ground data, in accordance with various embodiments. In an embodiment, the ground data may be sensor information collected by a number of sensors. In an embodiment, the number of sensors may be wearable sensors worn by a user. In an embodiment, the ground data may be pulled by a MCX device carried by a first responder. Further, the first responder transmits the ground data to a MCX server. In an embodiment, the first responder may pull the ground data through a UE and transmit the ground data through the UE to the MCX server. In an embodiment, a Sensor Payload Message may be directly shared without Sensor Request and Sensor Response Message, since "time" being a crucial Key Performance Indicator (KPI) for a MCX call.

Figure 11:
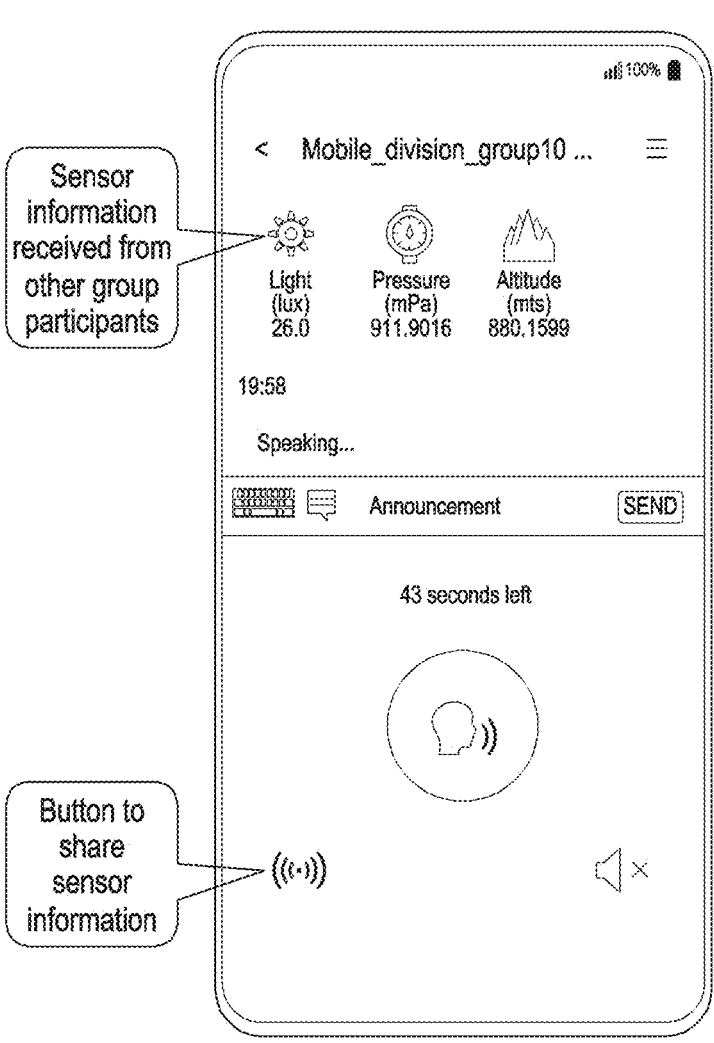
FIG. 11 is a diagram illustrating an example user interface depicting transmission of sensor information between a user A and a user B on a MCX call, in accordance with various embodiments.

FIG. 11 is a diagram illustrating an example user interface 1100 illustrating transmission of sensor information between a user A and a user B on a MCX call, in accordance with various embodiments. In an embodiment, the user A may be a first responder sharing the sensor information related to a disaster from an area.

Figure 12A:
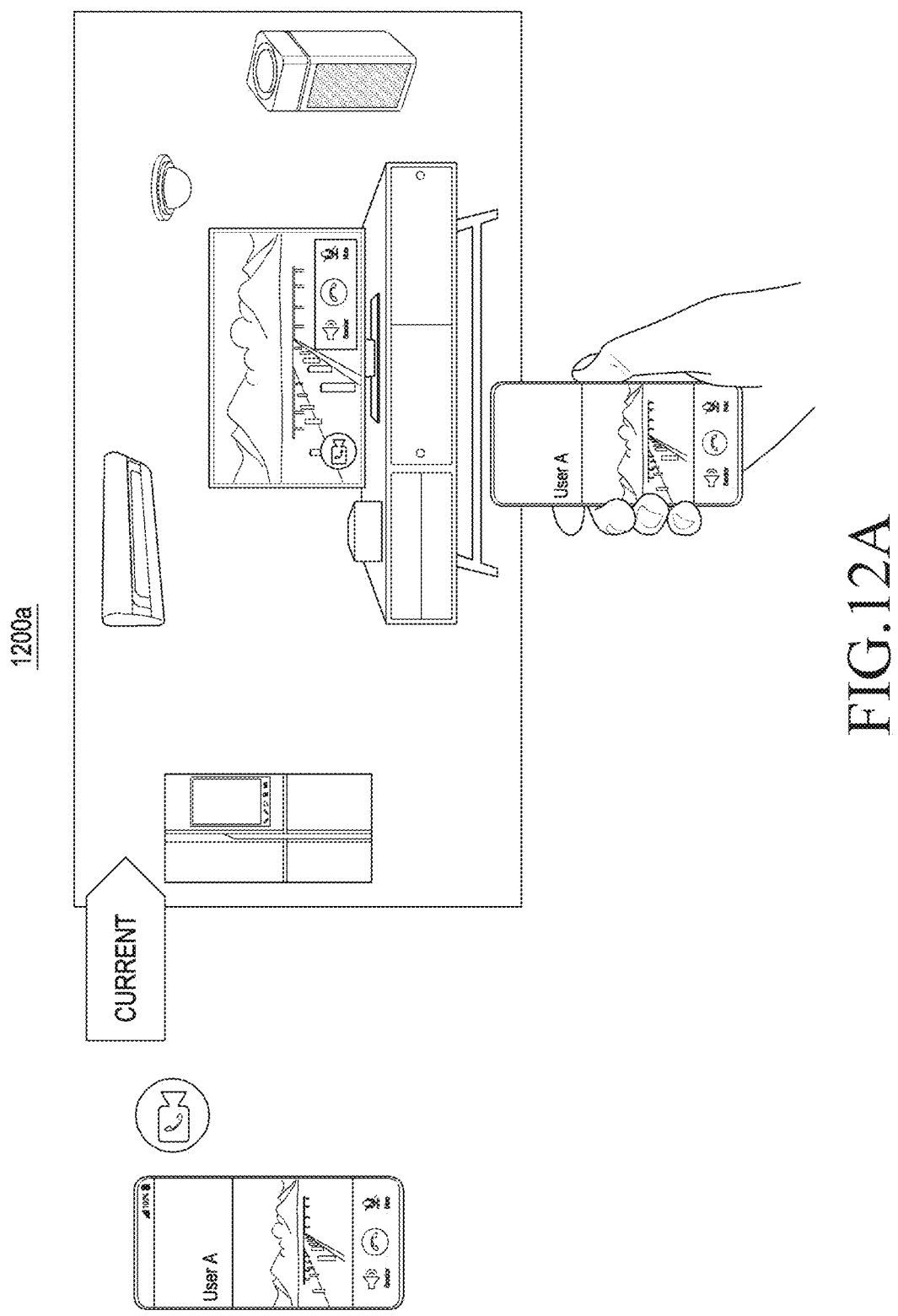
FIG. 12A is a diagram illustrating an image depicting a user experience during an IMS video call, in accordance with an existing technique.

FIG. 12A is a diagram 1200a illustrating an example user experience during an IMS video call, in accordance with an existing technique.

Figure 12B:
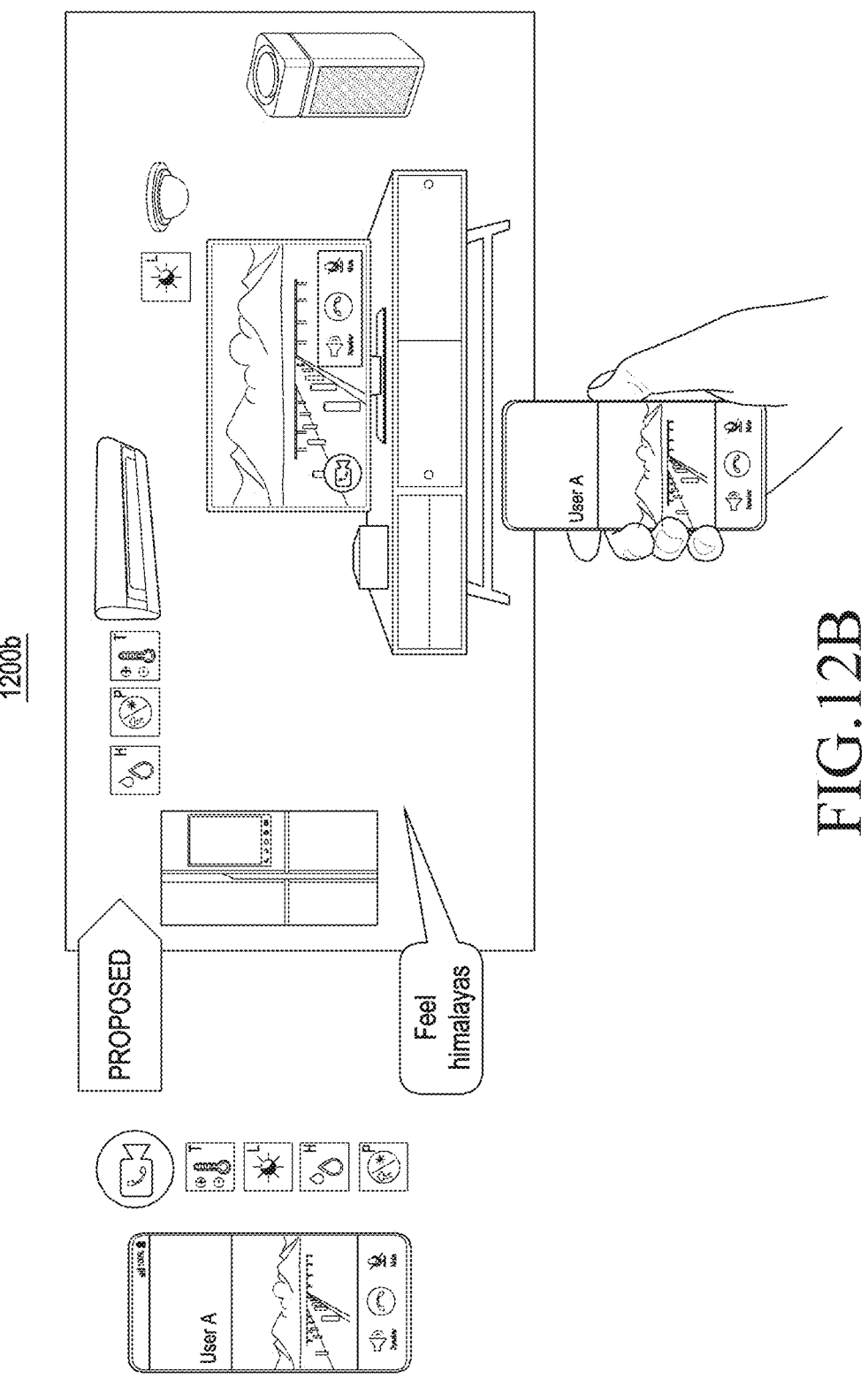
FIG. 12B illustrates an image depicting the user experience during the IMS video call with ambience sharing, in accordance with various embodiments.

FIG. 12B is a diagram 1200b illustrating an example user experience during the call with an ambience sharing, in accordance with various embodiments. In an embodiment, a user receiving the call along with live captured sensor information fed to a smart IOT appliance may be able to feel an ambience along with a scenic view being shared on the call.

Figure 13A:
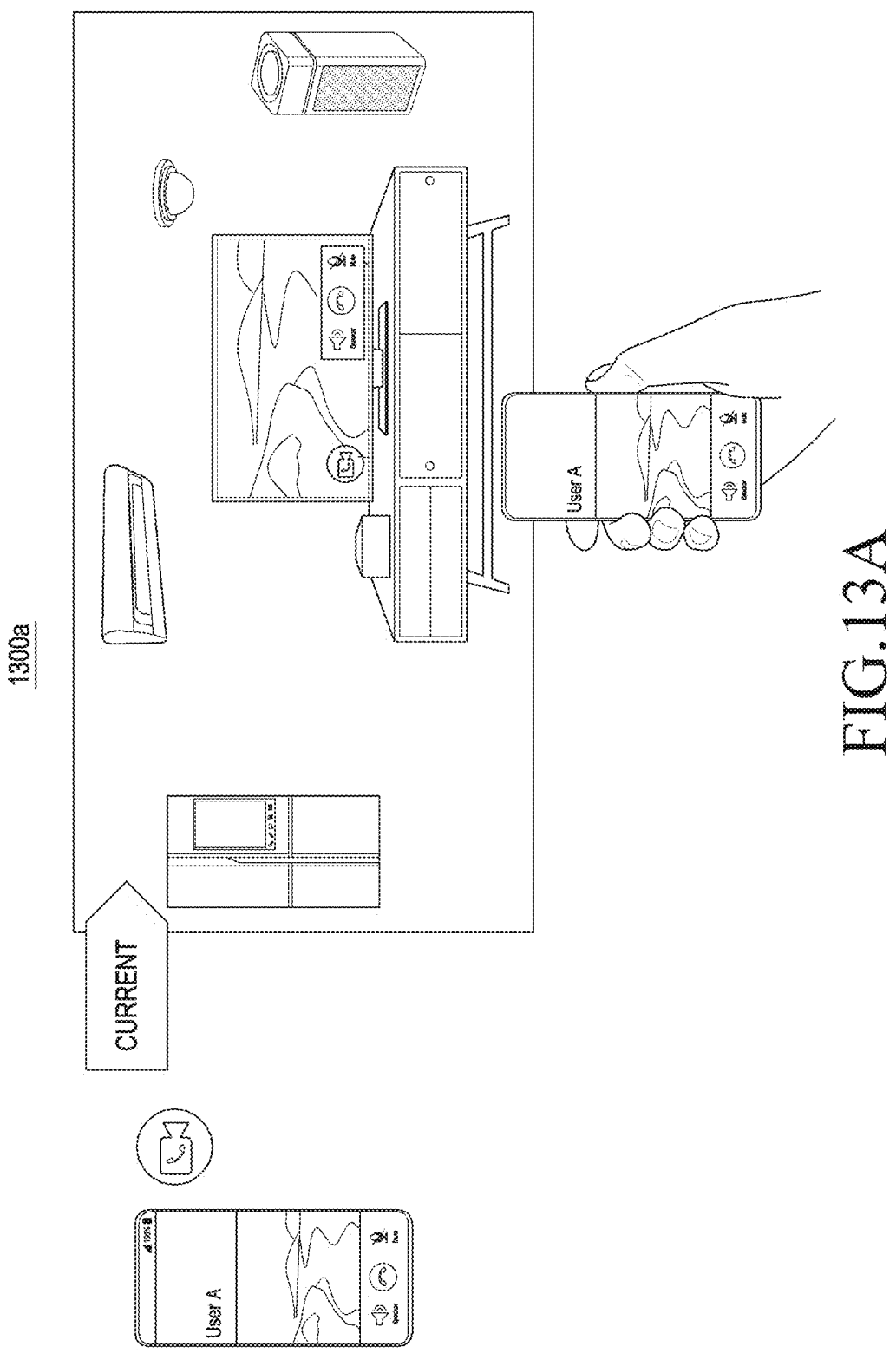
FIG. 13A is a diagram illustrating an image depicting a user experience during a call, in accordance with an existing technique.

FIG. 13A is a diagram 1300a illustrating a user experience during a call, in accordance with an existing technique.

Figure 13B:
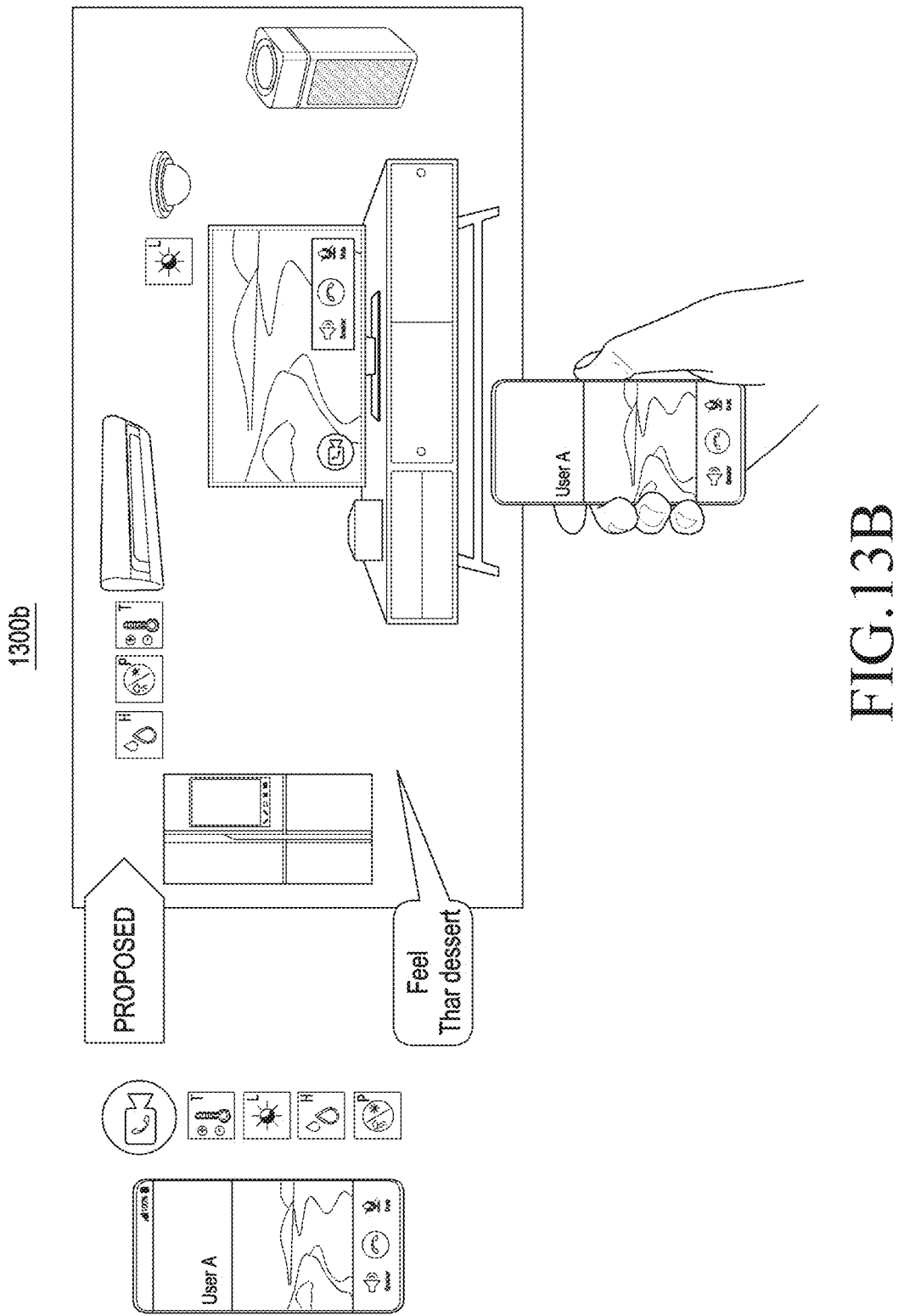
FIG. 13B is a diagram illustrating an image depicting the user experience during the call with ambience sharing, in accordance with various embodiments.

FIG. 13B is a diagram 1300b illustrating an example user experience during the call with ambience sharing, in accordance with various embodiments. In an embodiment, a user receiving call through an IOT appliance may be able to have a feel of a scenic view being shared on call through at least one sensor.

Figure 14A:
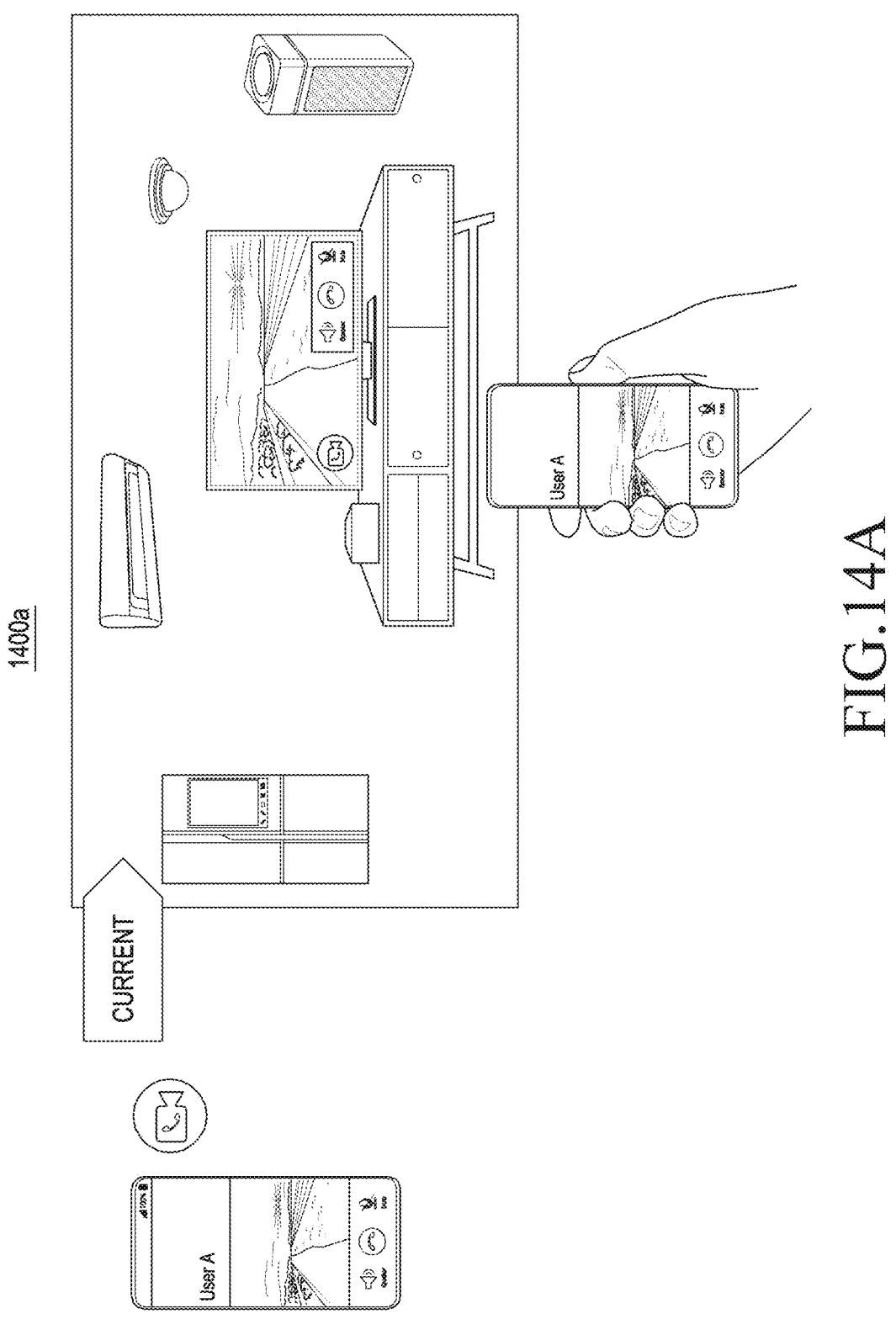
FIG. 14A is a diagram illustrating an image depicting a user experience during a call, in accordance with an existing technique.

FIG. 14A is a diagram 1400a illustrating a user experience during a call, in accordance with an existing technique.

Figure 14B:
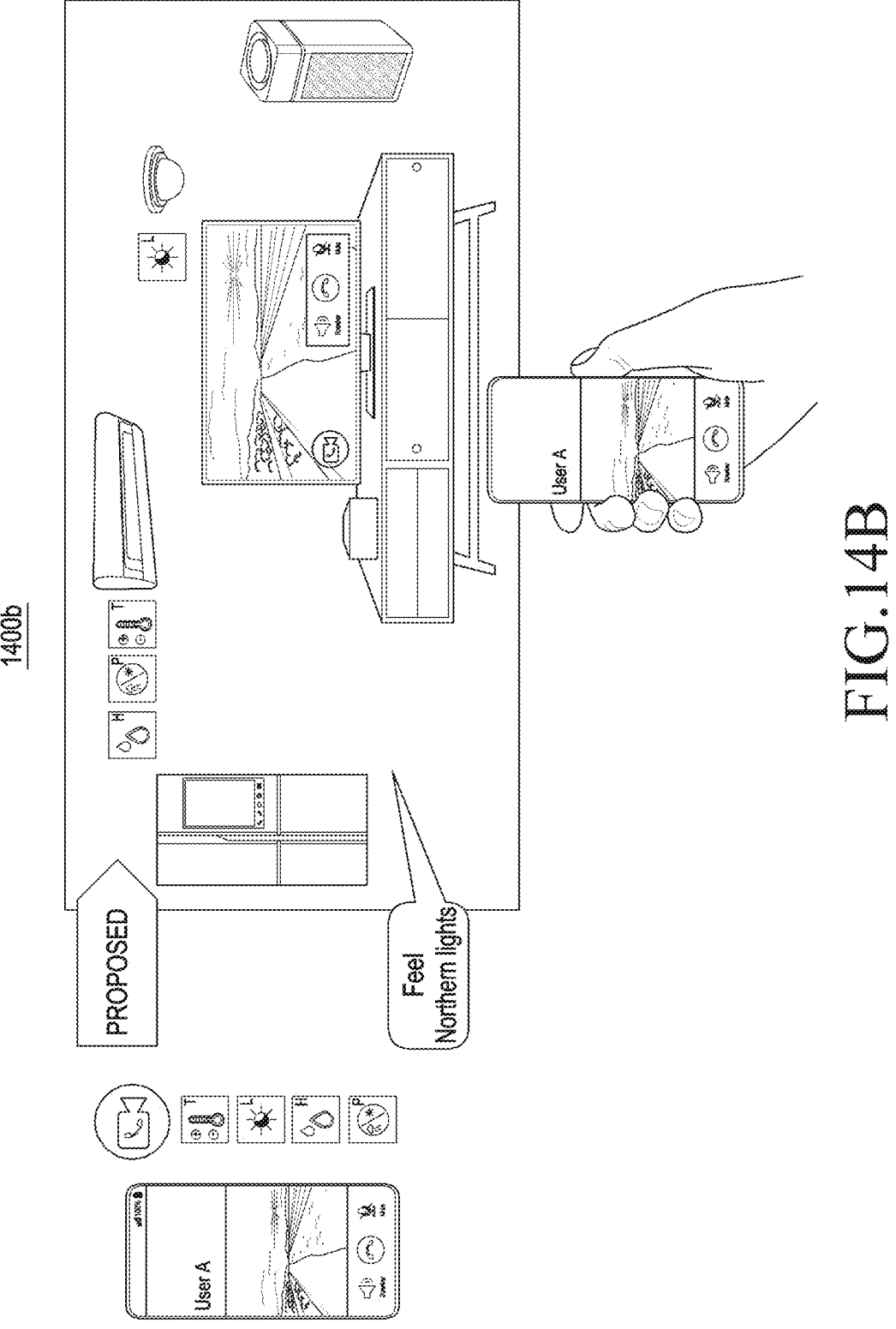
FIG. 14B is a diagram illustrating an image depicting the user experience during the call with ambience sharing, in accordance with various embodiments.

FIG. 14B is a diagram 1400b illustrating an example user experience during the call with an ambience sharing, in accordance with an embodiment of the present disclosure. In an embodiment, a user receiving the call through a smart IOT appliance may be able to have a feel of a scenic view being shared on call through at least one sensor.

FIG. 15 is a diagram 1500 illustrating a number of use cases corresponding to FIGS. 12A, 13A, and 14A, in accordance with an existing technique.

While specific language has been used to describe the present disclosure, any limitations arising on account thereto, are not intended. As would be apparent to a person in the art, various working modifications may be made to the method to implement the disclosed concept as taught herein. The drawings and the foregoing description give examples of embodiments. Those skilled in the art will appreciate that one or more of the described elements may well be combined into a single functional element. Certain elements may be split into multiple functional elements. Elements from one embodiment may be added to another embodiment.

What is claimed is:

1. A method for sharing sensor information in a mission critical services (MCX) call, the sensor information including at least three of ambient temperature, ambient light, ambient barometric pressure, ambient humidity, and ambient wind speed, the method comprising: establishing, by a first user equipment (UE), an Internet Protocol Multimedia Subsystem (IMS) media call with a second UE, the call including an ambience share feature tag including an IMS application reference identifier (IARI) with a value indicating a capability of ambience sharing by the first UE, sending, by the first UE to the second UE, a sensor list request message, receiving, by the first UE, a sensor list response message including a subtype field and a sensor message field containing the sensor information in the MCX call; and obtaining, by the first UE, the sensor information associated with the second UE from the sensor list response message, wherein: the subtype field includes a value among a plurality of predetermined values, the sensor information in the sensor message field includes a list of sensors attached to the first UE in response to the subtype field including a first value among the plurality of predetermined values, wherein the first value corresponds to the list of sensors along with captured sensor data with respect to an ambience from at least one sensor from a number of sensors attached to the second UE, the sensor information in the sensor message field includes a list of sensors on peripheral devices associated with the second UE in response to the subtype field including a second value among the plurality of predetermined values, wherein the peripheral devices include at least two of: an air conditioner conditioning air in a room where the second UE is located to simulate an ambience of an environment surrounding the first UE, a heater heating the room where the second UE is located to simulate the ambience of the environment surrounding the first UE, a light source lighting the room where the second UE is located to simulate the ambience of the environment surrounding the first UE, a humidifier humidifying the air in the room where the second UE is located to simulate the ambience of the environment surrounding the first UE, a blower blowing air in the room where the second UE is located to simulate the ambience of the environment surrounding the first UE, a curtain in the room where the second UE is located to simulate the ambience of the environment surrounding the first UE, one or more smart or internet of things devices in a building where the second UE is located to simulate the ambience of the environment surrounding the first UE, and one or more smart home devices in the building where the second UE is located to simulate the ambience of the environment surrounding the first UE, and wherein the second value corresponds to the list of sensors related to the ambience of the environment surrounding the first UE for which there is a peripheral device associated with the second UE, and the sensor information in the sensor list response message field includes a list of a plurality of sensors attached to the second UE in response to the subtype field including a third value among the plurality of predetermined values, wherein the third value corresponds to the list of sensors related to the ambience fetched by an on-device sensor in the first UE and a wearable attached to the first UE, wherein the IMS media call includes shared sensor information related to two or more of ambient light, ambient pressure, ambient temperature, and ambient humidity of an environment surrounding the first UE, along with audio and video.

2. The method of claim 1, wherein receiving the sensor list response message comprises receiving the sensor list response message from a server or the second UE.

3. The method of claim 1, wherein the sensor information is shared while initiating the MCX call, and during the MCX call.

4. The method of claim 1, wherein the MCX call comprises one of a MCX group call, a MCX private call, a MCX messaging, a mission-critical push-to-talk (MCPTT) call, a MCVideo call, and a MCData message.

5. The method of claim 1, wherein the MCX call is one of a group call and a private call.

6. The method of claim 1, wherein the sensor information comprises at least one of information about at least one sensor, and at least one parameter captured by the at least one sensor.

7. The method of claim 6, wherein the at least one sensor includes one of an on-device sensor, a wearable device associated with the second UE, and an Internet of Things (IoT) device associated with the second UE.

8. The method of claim 1, wherein the sensor list response message is based on an application-defined real-time transport control protocol (RTCP) packet format.

9. The method of claim 1, wherein the sensor list response message further comprises:

a name field including information indicating the MCX sensor message; and a synchronization source (SSRC) field including information indicating the second UE.

10. A first user equipment (UE) for sharing sensor information in a mission critical services (MCX) call, the sensor information including at least three of ambient temperature, ambient light, ambient barometric pressure, ambient humidity, and ambient wind speed, the UE comprising: memory storing instructions; a transceiver; and at least one processor coupled to the memory and the transceiver, wherein the instructions, when executed by the at least one processor, cause the first UE to: establish an Internet Protocol Multimedia Subsystem (IMS) media call with a second UE, the call including an ambience share feature tag including an IMS application reference identifier (IARI) with a value indicating a capability of ambience sharing by the first UE, sending, to the second UE, a sensor list request message, receive a sensor list response message including a subtype field and a sensor message field containing sensor information in the MCX call, and obtain the sensor information associated with the second UE from the sensor list response message, wherein: the subtype field includes a value among a plurality of predetermined values, and the sensor information in the sensor list response message field includes a list of sensors attached to the first UE when the subtype field includes a first value among the plurality of predetermined values, wherein the first value corresponds to the list of sensors along with captured sensor data with respect to an ambience from at least one sensor from a number of sensors attached to the second UE, the sensor information in the sensor list response message field includes a list of sensors on peripheral devices associated with the second UE when the subtype field includes a second value among the plurality of predetermined values, wherein the peripheral devices include at least two of: an air conditioner conditioning air in a room where the second UE is located to simulate an ambience of an environment surrounding the first UE, a heater heating the room where the second UE is located to simulate the ambience of the environment surrounding the first UE, a light source lighting the room where the second UE is located to simulate the ambience of the environment surrounding the first UE, a humidifier humidifying the air in the room where the second UE is located to simulate the ambience of the environment surrounding the first UE, a blower blowing air in the room where the second UE is located to simulate the ambience of the environment surrounding the first UE, a curtain in the room where the second UE is located to simulate the ambience of the environment surrounding the first UE, one or more smart or internet of things devices in a building where the second UE is located to simulate the ambience of the environment surrounding the first UE, and one or more smart home devices in the building where the second UE is located to simulate the ambience of the environment surrounding the first UE, and wherein the second value corresponds to the list of sensors related to the ambience of the environment surrounding the first UE for which there is a peripheral device associated with the second UE, and the sensor information in the sensor list response message field includes a list of a plurality of sensors attached to the second UE when the subtype field includes a third value among the plurality of predetermined values, wherein the third value corresponds to the list of sensors related to the ambience fetched by an on-device sensor in the first UE and a wearable attached to the first UE, wherein the IMS media call includes shared sensor information related to two or more of ambient light, ambient pressure, ambient temperature, and ambient humidity of an environment surrounding the first UE, along with audio and video.

11. The first UE of claim 10, wherein the instructions, when executed by the at least one processor cause the first UE to receive the sensor message from a server or the second UE.

12. The first UE of claim 10, wherein the sensor information is shared while initiating the MCX call, and during the MCX call.

13. The first UE of claim 10, wherein the MCX call comprises one of a MCX group call, a MCX private call, a MCX messaging, a mission-critical push-to-talk (MCPTT) call, a MCVideo call, and a MCData message.

14. The first UE of claim 10, wherein the MCX call is one of a group call and a private call.

15. The first UE of claim 10, wherein the sensor information comprises at least one of information about at least one sensor associated with the second UE, and at least one parameter captured by the at least one sensor.

16. The first UE of claim 15, wherein the at least one sensor includes one of an on-device sensor, a wearable device associated with the second UE, and an Internet of Things (IoT) device associated with the second UE.

17. The first UE of claim 10, wherein the sensor list response message is based on an application-defined real-time transport control protocol (RTCP) packet format.

18. The first UE of claim 10, wherein the sensor list response message further comprises:

a name field including information indicating the MCX sensor message; and a synchronization source (SSRC) field including information indicating the second UE.

* * * * *